(12) United States Patent
Shitomi

(10) Patent No.: US 8,504,648 B2
(45) Date of Patent: Aug. 6, 2013

(54) METHOD AND APPARATUS FOR STORAGE-SERVICE-PROVIDER-AWARE STORAGE SYSTEM

(75) Inventor: Hidehisa Shitomi, Mountain View, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/860,212

(22) Filed: Aug. 20, 2010

(65) Prior Publication Data

US 2010/0318625 A1  Dec. 16, 2010

Related U.S. Application Data

(63) Continuation of application No. 11/826,853, filed on Jul. 19, 2007, now Pat. No. 7,801,993.

(51) Int. Cl.
*G06F 15/16* (2006.01)
*G06F 13/12* (2006.01)
*G06F 13/38* (2006.01)

(52) U.S. Cl.
USPC ......... 709/217; 709/219; 707/E17.01; 710/74

(58) Field of Classification Search
None
See application file for complete search history.

(56) References Cited

U.S. PATENT DOCUMENTS

| | | | |
|---|---|---|---|
| 6,934,799 B2 | 8/2005 | Acharya et al. | |
| 7,079,293 B2 | 7/2006 | Risheq | |
| 7,143,235 B1 | 11/2006 | Watanabe et al. | |
| 7,174,399 B2 * | 2/2007 | Yamamoto | 710/74 |
| 7,437,530 B1 | 10/2008 | Rajan | |
| 7,653,832 B2 | 1/2010 | Faibish et al. | |
| 7,769,978 B2 * | 8/2010 | Gorobets et al. | 711/203 |
| 2004/0030668 A1 * | 2/2004 | Pawlowski et al. | 707/1 |
| 2006/0218207 A1 * | 9/2006 | Nonaka | 707/203 |
| 2007/0088702 A1 * | 4/2007 | Fridella et al. | 707/10 |
| 2008/0294696 A1 * | 11/2008 | Frandzel | 707/200 |
| 2008/0307155 A1 * | 12/2008 | Sinclair | 711/103 |

OTHER PUBLICATIONS

Verizon Online Backup & sharing; http://netservices.verizon.net/portal/site/msa/?epi_menuItemID=7c76dala52e24b23e19bc43353295c43&nv=G-i-12&catalogname=MyStorage; Verizon; Jul. 18, 2007.
Apple.mac; http://www.apple.com/dotmac/; Apple, Inc.; Jul. 18, 2007.
AmazonS3;http://www.amazon.com/gp/browse.html?node=16427261; Amazon.com, Inc.; Jul. 18, 2007.

* cited by examiner

Primary Examiner — Wen-Tai Lin
(74) Attorney, Agent, or Firm — Mattingly & Malur, PC

(57) ABSTRACT

A storage system includes a virtual volume configured on a storage controller and mapping to a physical storage capacity maintained at a remote location by a storage service provider (SSP). The storage controller receives an I/O command in a block-based protocol specifying a logical block address (LBA). The storage controller correlates the LBA with a file name of a file stored by the SSP, translates the I/O command to an IP-supported protocol, and forwards the translated I/O command with the file name to the SSP for processing. In the case of a write command, the SSP stores the write data using the specified file name. In the case of a read command, the SSP enables download of data from the specified file name. In an alternative embodiment, a NAS head may replace the storage controller for correlating the LBA with a file name and translating the I/O command.

26 Claims, 34 Drawing Sheets

1114

| SSP VOL# | SSP space ID | WWN | Capacity (GB) | URL | User name | Password | ... |
|---|---|---|---|---|---|---|---|
| 11141 | 11142 | 11143 | 11144 | 11145 | 11146 | 11147 | |
| 201 | 001 | 201 | 300 | A.com | A | *** | ... |
| 202 | 002 | 202 | 200 | B.com | A | *** | ... |
| 203 | 003 | 203 | 100 | C.com | A | *** | ... |
| 204 | 004 | 204 | 250 | A.com | B | *** | ... |
| 205 | 005 | 205 | 150 | B.com | B | *** | ... |

SSP Volume Management Table

1115

| VOL# | performance | reliability | usage | availability | ... |
|---|---|---|---|---|---|
| 001 | High | High | Tier1 | 99.999 | ... |
| 102 | Mid | Mid | Tier2 | 99.99 | ... |
| 103 | High | Mid | Tier2 | 99.99 | ... |
| 104 | Low | Mid | backup | 99.9 | ... |
| 205 | Mid | Low | backup | 99.9 | ... |

Volume Character Table

| VOL# | LUN | WWN | ... |
|---|---|---|---|
| 001 | 001 | 001 | ... |
| 102 | 002 | 002 | ... |
| 103 | 003 | 003 | ... |
| 104 | 004 | 004 | ... |
| 205 | 005 | 005 | ... |

Volume Management Table

| VOL# | Ext. LUN | WWN | ... |
|---|---|---|---|
| 101 | 001 | 101 | ... |
| 102 | 002 | 102 | ... |
| 103 | 003 | 103 | ... |
| 104 | 004 | 104 | ... |
| 105 | 005 | 105 | ... |

External Volume Management Table

| SSP VOL# | SSP space ID | WWN | Capacity (GB) | URL | User name | Pass word | ... |
|---|---|---|---|---|---|---|---|
| 201 | 001 | 201 | 300 | A.com | A | *** | ... |
| 202 | 002 | 202 | 200 | B.com | A | *** | ... |
| 203 | 003 | 203 | 100 | C.com | A | *** | ... |
| 204 | 004 | 204 | 250 | A.com | B | *** | ... |
| 205 | 005 | 205 | 150 | B.com | B | *** | ... |

SSP Volume Management Table

| SSP VOL# | WWN | LUN | LBA | File Name | ... |
|---|---|---|---|---|---|
| 201 | 001 | 001 | 001 | /001/001/001 | ... |
| 201 | 001 | 002 | 002 | /001/001/002 | ... |
| 201 | 001 | 001 | 003 | /001/001/003 | ... |
| 201 | 001 | 001 | 004 | /001/001/004 | ... |
| 202 | 002 | 002 | 001 | /002/002/001 | ... |
| 202 | 002 | 002 | 004 | /002/002/004 | ... |
| 203 | 003 | 003 | 001 | /003/003/001 | ... |
| 204 | 004 | 004 | 001 | /004/004/001 | ... |
| 205 | 005 | 005 | 003 | /005/005/003 | ... |
| 205 | 005 | 005 | 004 | /005/005/004 | ... |
| 205 | 005 | 005 | 005 | /005/005/005 | ... |

23031, 23032, 23033, 23034, 23035

SSP Layout Management Table

FIG. 9

SSP Volume Creation

Path Definition

WRITE

WRITE

READ

Path Deletion

WRITE

READ

SSP Volume Creation

File System Creation

WRITE

SSP Volume Deletion

METHOD AND APPARATUS FOR STORAGE-SERVICE-PROVIDER-AWARE STORAGE SYSTEM

This is a continuation application of U.S. patent application Ser. No. 11/826,853, filed Jul. 19, 2007 (now U.S. Pat. No. 7,801,993), which is incorporated herein by reference.

BACKGROUND OF THE INVENTION

The present invention relates generally to storage systems for storing data.

DESCRIPTION OF RELATED ART

Storage Service Providers (SSPs) and, more particularly, Internet SSPs, are providers of storage capacity that enable users to stored large amounts of data via the Internet in centralized managed storage facilities. For example, companies such as Verizon®, AT&T®, Comcast®, and other Internet and telecommunications companies now provide storage space for a fee (sometimes referred to as "online storage") that is accessible via the worldwide web, FTP (File Transfer Protocol), or the like, to enable end users, such as individuals and/or companies to store, backup, and share files, such as documents, photographs, multimedia files, and the like. Also, companies such as Apple® and Amazon® provide web-based storage space to enable users to backup and share files, such as for web-based application developers to share data and programs.

Storage services provided via the Internet are usually web-based, and thus, the access protocols used for accessing the storage space provided by the provider of storage services are typically Internet Protocol (IP)-supported protocols, such as HTTP (Hypertext Transfer Protocol) or FTP, but may also be a specialized API (Application Program Interface). Clients or end users are able to utilize the storage capacity through a client application such as a web browser, for example, Internet Explorer®, Firefox®, or the like. However, the interfaces provided by the web browsers mean that clients or end users cannot easily utilize the SSP storage capacity in the same way that they would use a conventional file system or volume in a storage system, because the Internet-based SSPs do not support common storage access interfaces and protocols such as SCSI and NFS/CIFS.

BRIEF SUMMARY OF THE INVENTION

The invention provides a method and apparatus for storage systems and NAS systems to virtualize SSP storage space as a local volume or file system. This enables clients to access SSP storage capacity via a common storage interface. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 5 illustrates an exemplary data structure of a volume character table.

FIG. 6 illustrates an exemplary data structure of a volume management table.

FIG. 7 illustrates an exemplary data structure of an external volume management table.

FIG. 8 illustrates an exemplary data structure of a SSP volume management table.

FIG. 9 illustrates an exemplary data structure of a SSP layout management table.

DETAILED DESCRIPTION OF THE INVENTION

Figure 1:
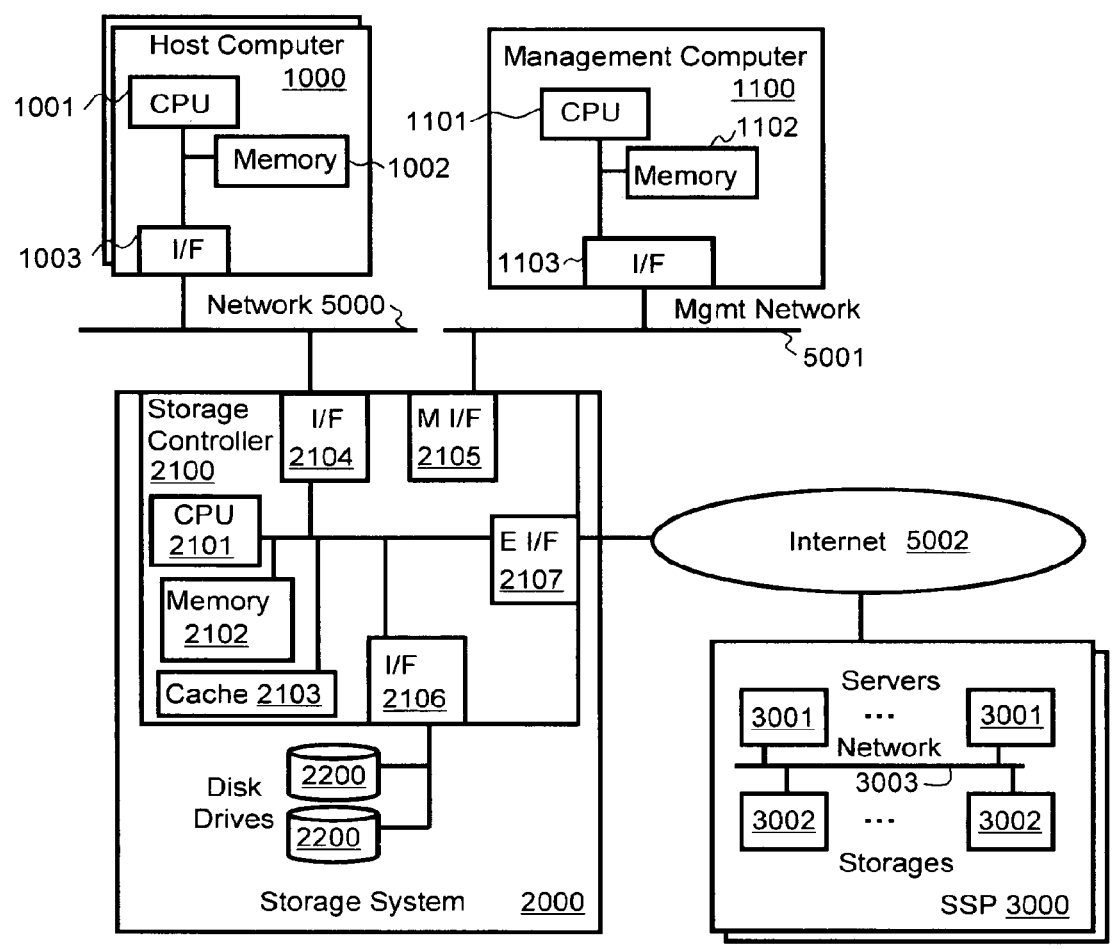
FIG. 1 illustrates an example of a hardware configuration in which the method and apparatus of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

The invention includes methods and apparatuses for virtualizing the storage capacity available at a SSP through use of a storage system that is configured under the invention to interact automatically with the SSP. A SSP layout management program and a protocol translation program on the storage system enable some features of the invention. Moreover, a volume character table also provided under the invention is able to present administrators with an option for selecting volume from among available types of volumes, such as, internal, external or SSP. The software of the invention may be embodied on a system memory, storage device, or other computer readable medium, as described further below.

From the user's point of view, an application can access the storage capacity provided on the SSP via the normal host I/O (input/output) operations such as using standard SCSI protocol or other block-based protocols, which means that the users do not have to use the web-based access methods or change application software on the host. Moreover, when compared with conventional access to the SSP storage through the Internet, an application using the system of the invention may be able to access the capacity faster because the cache on the storage system can be used. From the storage administrator's point of view, when the storage administrator allocates some amount of storage capacity for the host computer, the subscribed SSP capacity can be utilized under the invention. The SSP's capacity is typically used for backup or when there is a shortage of internal capacity in the storage system. However, when the SSP capacity is used, an application on a host can transparently access the SSP capacity, which means the application does not have to distinguish between an SSP volume and other volumes. Moreover, since the administrator of the storage system does not need to manage the SSP capacity, the Total Cost of Ownership (TCO) can be decreased through some implementations of the invention.

First Embodiments

Hardware Architecture

FIG. 1 illustrates an example of a hardware configuration of an information system in which the method and apparatus of the invention is applied. The information system is composed of a storage system 2000 in communication with one or more host computers 1000, a management computer 1100, and one or more SSPs 3000. Host computer 1000 includes a CPU (central processing unit) 1001 and a memory 1002 for running one or more applications (not shown in FIG. 1). Host computer 1000 includes an interface (I/F) 1003 to enable host computer 1000 to be either directly connected to storage systems 2000, or connected via a network 5000. Typical media of network 5000 may be Fibre Channel (FC), Ethernet, or other network type. Any appropriate network media can be used, and the invention is not limited by the connection type.

Management computer 1100 includes a CPU 1101 and memory 1102 for running several storage management related programs (not shown in FIG. 1) which are discussed further below. The management computer 1100 includes an I/F 1103 that enables management computer to communicate with storage system 2000, either through direct connection, via a separate management network 5001, or via other connection, such as network 5000. Ethernet is a typical example of the media type for management network 5001, although any other suitable network type may also be used.

Storage system 2000 consists of two primary parts, a storage controller 2100 and a plurality of storage devices 2200. The storage controller 2100 includes a CPU 2101, a memory 2102, a cache memory 2103, a host I/F 2104 for communication with host computer 1000 via network 5000, a management I/F 2105 for communication with management computer 1100 via network 5001, a disk I/F 2106 for communication with storage devices 2200, and an external I/F 2107 to enable communication with SSP 3000 via a network such as Internet 5002. Storage controller 2100 processes I/Os from host computer 1000, and management operations from management computer 1100. Storage control software, discussed further below, which processes I/O requests and performs other operations, is stored in tangible form in memory 2102 or other computer readable medium, and CPU 2101 executes the software. Cache memory 2103 stores write data received from the host computer 1000 temporarily before the data is stored into storage devices 2200, and cache memory 2103 also stores read data that is requested by the host computer 1000. Cache memory 2103 advantageously may be a battery backed-up non-volatile memory. Disk interface 2106 is used to connect between storage controller 2100 and internal storage devices 2200, which are hard disk drives in the preferred embodiment. Fibre Channel (FC) is a typical example of the connection type used, although the connection type may be dependent upon the type of storage devices used, and thus, a suitable alternative interface is used in alternative embodiments. Additionally, it should be noted that the storage system 2000 does not necessarily have to have the internal storage devices 2200. External Interface 2107 is used to connect between storage controller 2100 and Storage Service Provider (SSP) 3000, such as via a modem (not shown) and the Internet 5002. Ethernet is a typical example of the interface 2107, although other suitable network interfaces can be applicable to the invention. The external I/F can also be utilized to connect between storage controller 2100 and an external storage system or tape drive (not shown in FIG. 1). In this case, Fibre Channel (FC) may be a more suitable type of connection. However, it should be noted that any suitable network interface can be implemented under the invention.

Storage devices 2200 are hard disk drives in the preferred embodiment. These storage devices 2200 may be FC drives, SATA drives or the like. In alternative embodiments, storage devices 2200 may be solid state memory, optical drives, tape drives, or the like. Also, storage devices 2200 may be eliminated, and/or an external storage system (not shown) may be put into communication with storage system 2000 to provide storage capacity. In the preferred embodiment, each of the disk devices 2200 processes I/O requests from the storage controller 2100 in accordance with some disk device storage commands, such as SCSI (small computer system interface) commands.

Storage Service Provider (hereafter SSP) 3000 is composed of one or more servers 3001 and one or more storage systems 3002 in order to provide storage space (i.e., capacity)

to subscribed users of the SSP 3000. The Internet 5002 is a typical network connection to the users of the SSP 3000, although any suitable network interface can be applicable to the invention. The servers 3001 process I/O requests from users, and the storage systems 3002 connected to the servers 3001 via an internal network 3003 store and retrieve user data in response to the user I/O operations. The particular hardware configuration of SSP 3000 does not affect the invention. Further, it should be noted that the hardware architecture set forth in FIG. 1 is for purposes of explanation only, and other appropriate hardware architecture can also be applied to the invention.

Software And Data Structures

Figure 2:
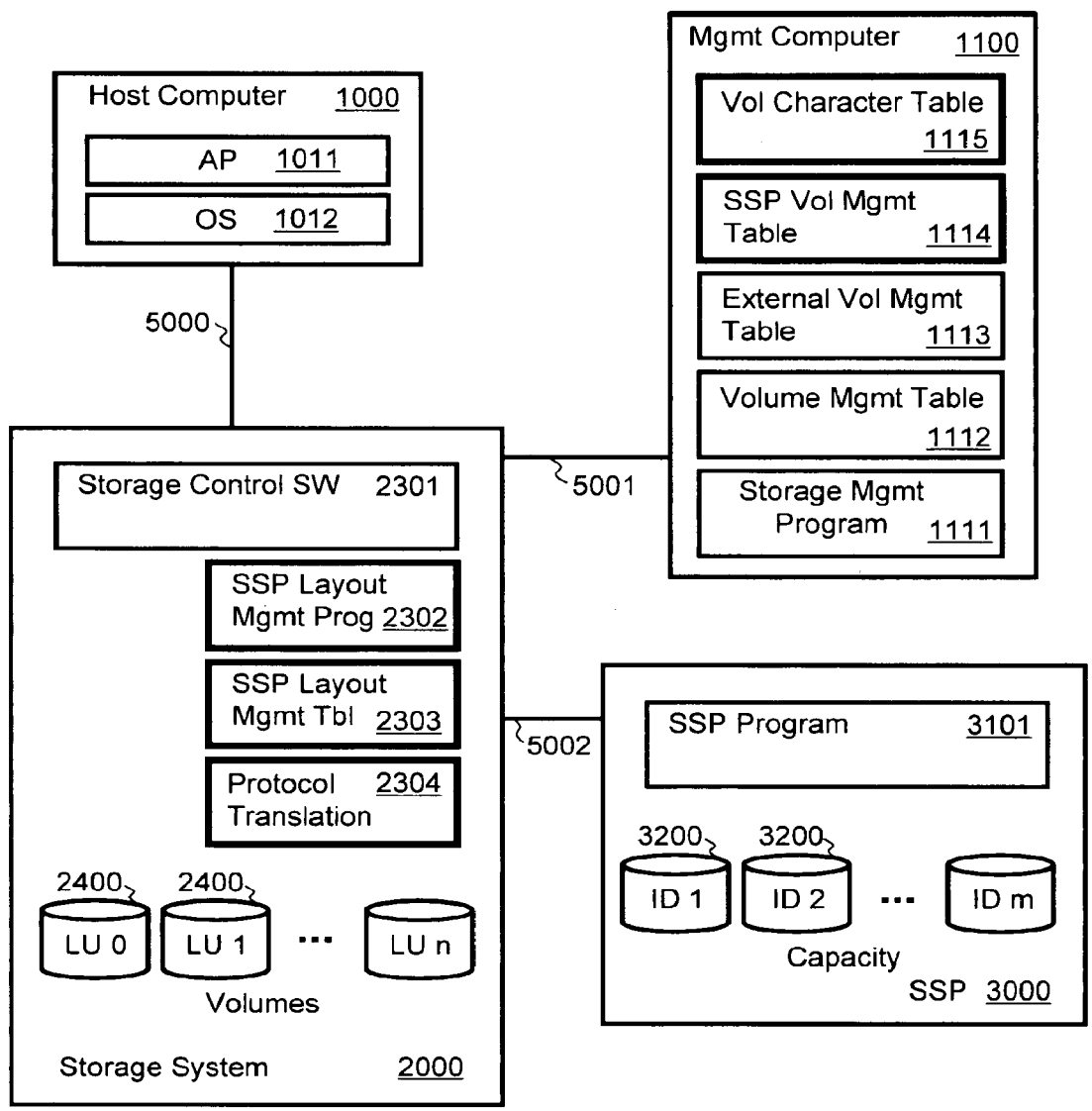
FIG. 2 illustrates an exemplary software configuration by which the invention may be applied in view of the architecture illustrated in FIG. 1.

FIG. 2 illustrates an example of a software configuration in which the method and apparatus of the invention is applied. Host computer 1000 is a computer on which some application (AP) 1011 generates I/O operations which are transmitted to storage system 2000. An operation system (OS) 1012 includes network drivers to connect between host computer 1000 and storage system 2000. Typical network communications may be based on (1) SCSI over FC/Ethernet/iSCSI, (2) NFS/CIFS file operations over Ethernet, or (3) HTTP over Ethernet, although any number of other communication protocols can be applied to the invention.

Software on the management computer 1100 includes a storage management program 1111 that may reside on the management computer 1100 in a computer readable medium, such as memory 1102. An administrator can use the storage management program 1111 to issue operations such as system configuration settings for storage system 2000. Data structures used by storage management program 1111 include a volume management table 1112, an external volume management table 1113, a SSP volume management table 1114, and a volume character table 1115, which are stored on the memory 1102 or hard disks (not shown) on management computer 1100. Volume management table 1112 manages a mapping relation between a volume on storage system 2000 and a host computer 1000. External volume management table 1113 manages a mapping relation between a virtual volume on storage system 2000 and a physical volume on an external storage. SSP volume management table 1114 manages a mapping relation between a virtual volume on the storage system 2000 for subscribed capacity from SSP 3000 and subscription information for the subscribed capacity. Volume character table 1115 manages the characteristics of internal volumes, external volumes, and subscribed SSP capacity. Each of these data structures is described in additional detail below with reference to FIGS. 5-9. The information in the tables is stored by administrator or storage management program 1111s 1111. In addition, these tables can be copied on the memory or hard disks on the storage system 2200.

Software on storage system 2000 includes storage control software (SW) 2301 which runs on CPU 2101 of the storage controller 2100, and may be stored in tangible form in memory 2102, disk drives 2200, or other computer readable medium. Logical volumes 2400 are created from one or more storage devices 2200 depicted in FIG. 1 are provided by the storage control SW. Volumes 2400 may be assigned unique LUNs (Logical Unit Numbers) to facilitate access to the volumes via storage protocols, such as SCSI. Moreover, RAID functionality or other storage control functionalities can be provided by the storage control SW by configuring a plurality of storage devices in a RAID array configuration and creating volumes on the RAID array. Storage control SW 2301 exports the volumes 2400 to host computer 1000, and storage control SW 2301 is able to receive and interpret network operations such as via FC, and then process SCSI commands received from host computer 1000. In addition, Storage control SW 2301 is able to process storage management operations. However, a separate control program could also be used to perform the management tasks. The particular software implementation disclosed in FIG. 2 is not intended to limit the invention.

In order for storage system 2000 to utilize subscribed SSP capacity, the following program and management tables are included under the invention and executed by storage controller 2100. SSP layout management program 2302 allocates a file on a SSP associated with a data block which is written by an application, such as AP 1011. The typical granularity of a data block may be equal to the size of a logical block or multiple logical blocks of a SCSI device or other storage device. For example, each logical block address for a volume can correspond to a different file stored at the SSP. Alternatively, multiple logical blocks can be aggregated and written by SSP layout management program 2302 to a file stored at the SSP. In this case, the order of the blocks in the file is determined by the SSP layout management program 2302. Then, when a request is received to read one or more of the blocks, the SSP management program retrieves the file and able to read each block by specifying the starting byte and block size in the file.

SSP layout management table 2303 manages a mapping relation between a virtual volume provided by storage system 2000 for the SSP capacity and a location of a file allocated on the SSP. The table can be stored on the memory 2102 or hard disks 2200 on the storage system 2000. In addition, the table can be copied onto the memory or hard disks on the management computer 1100. Protocol translation program 2304 translates the storage access protocol into the particular SSP access protocol. Typically, protocol translation program 2304 might translate SCSI protocol received from the host into HTTP or FTP protocol. Each of the foregoing may be stored in tangible form in memory 2102, disk drives 2200, or other computer readable medium.

SSP program 3101 runs on the SSP servers and receives operations to access and store data on the subscribed capacity 3200 (i.e., the storage space allotted to the particular SSP user or subscriber by the SSP). The program is usually a Web-based application, and can be accessed by HTTP protocol. Each of the SSPs provides one or more subscribed capacities 3200 to the SSP user (i.e., the subscriber), and typically enables the user to sign in and store data to the subscribed capacity 3200 by following a prescribed procedure.

Figure 3:
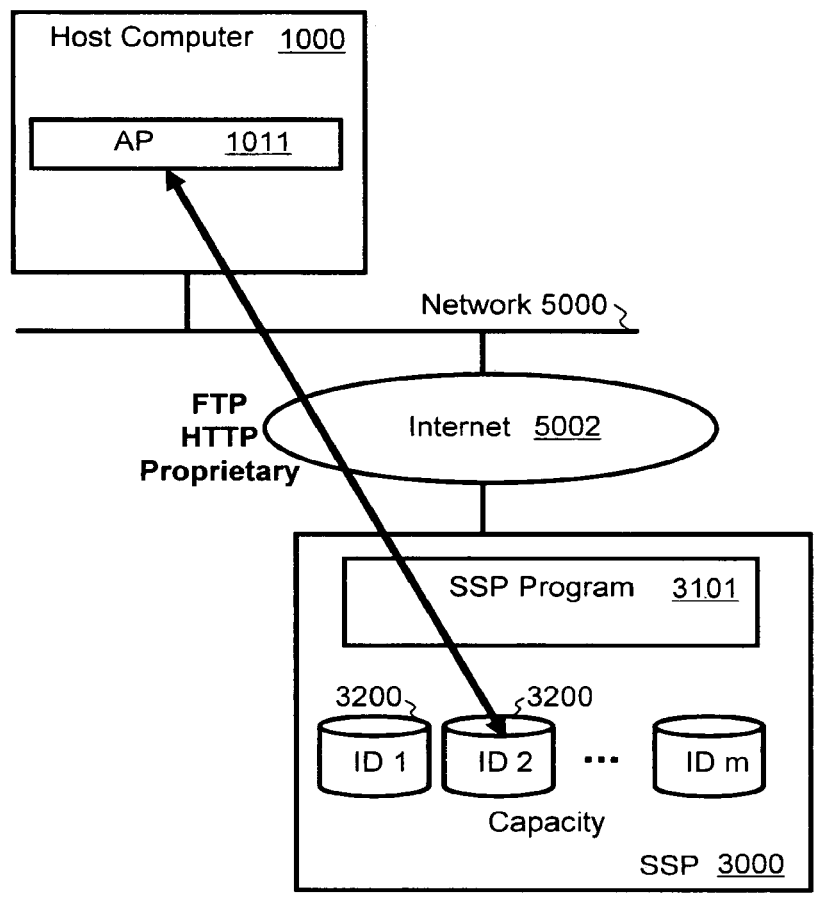
FIG. 3 illustrates a conceptual diagram of how a host computer might access a SSP via the Internet.

FIG. 3 represents a conceptual diagram of a method of how a SSP might be used from a host computer before implementation of the invention. The subscribed capacity from the SSP is mainly used for backup or data sharing. The following is a typical procedure to subscribe and utilize the capacity 3200 provided by the SSP. First, an administrator or other user of host computer 1000 requests a subscription of some amount of capacity 3200 from SSP 3000. During the subscription process, the user may provide account information (e.g. a user name and a password) for accessing the subscribed capacity 3200. Next, the SSP program 3101 sets aside or designates a certain amount of storage space to serve as the subscribed capacity 3200 in response to the request from the user. Finally, the user writes and reads data, such as from AP 1011, onto the SSP 3000 by using the access method specified by the SSP. HTTP and FTP are examples of the typical access methods, although some SSPs may have a proprietary access method.

Figure 4:
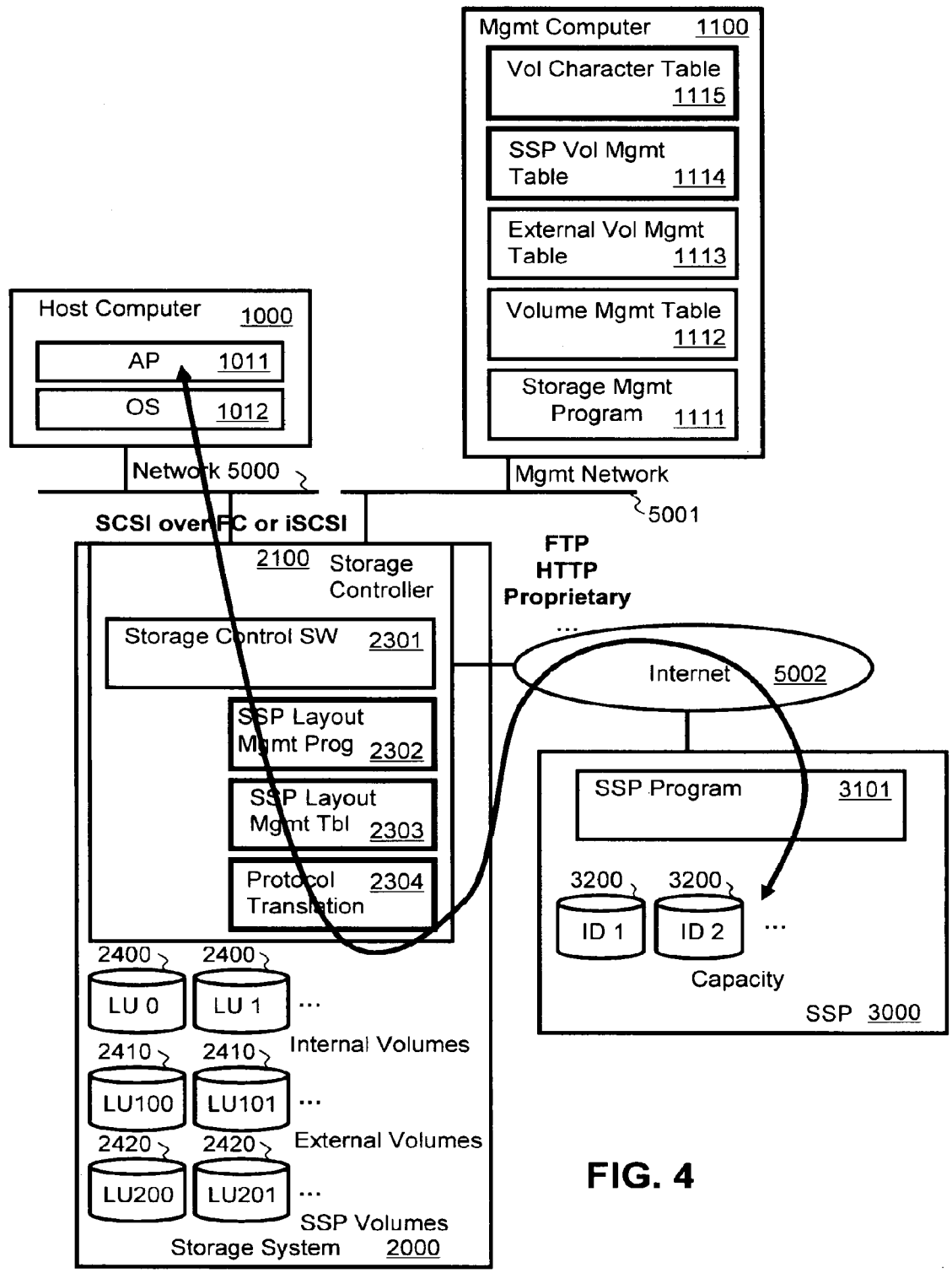
FIG. 4 illustrates a conceptual diagram of accessing a SSP via the SSP-aware storage system of the invention.

FIG. 4 illustrates a conceptual diagram of a SSP-aware storage system 2000 implemented according to the first embodiments of the invention. The storage system 2000 is able to provide one or more virtual volumes (SSP volumes) 2420 which are represented to the host computer 1000 as conventional logical volumes 2400, but which are mapped to physical storage capacity that is physically located at SSP 3200. Thus, the host computer and the user at the host computer 1000 are able to access and use the virtual volumes 2420, in the same manner as internal volumes 2400. The storage system 2000 may also or alternatively include external volumes 2410, which are virtual volumes that map to an external storage system (not shown in FIG. 4), as described below in additional embodiments.

There are at least two large advantages to be gained from implementing this mechanism. One is from the user's point of view and the other is from the storage administrator's point of view. From the user's point of view, an AP 1011 can access and use the capacity on SSP 3000 via normal host I/O operations such as via SCSI protocol, which means that the AP 1011 does not have to use the web-based access method described with reference to FIG. 3, and does not require any additional intervention by the user. Many applications are written to communicate and access storage volumes on a storage system directly via SCSI protocol, and, thus, the storage system 2000 enables the AP 1011 to automatically access storage capacity on SSP 3000 without requiring modification of AP 1011 or intervention by a user on host computer 1000. Additionally, in comparison with the access method of FIG. 3 through the Internet, an AP 1011 may be able to access the capacity 3200 on SSP 300 faster because cache 2103 on storage system 2000 can be used for temporarily storing data to be stored to capacity 3200 or data read from capacity 3200.

From the storage administrator's point of view, when the storage administrator allocates some capacity for host computer 1000, the subscribed SSP capacity 3200 can be utilized under the invention. SSP capacity 3200 may typically used for data backup or when there is a shortage of internal capacity in storage system 2000. An AP 1011 can transparently access SSP capacity, which means that AP 1011 does not have to distinguish between SSP volumes 2420 and other volumes 2400. Moreover, since the administrator does not need to manage the SSP capacity, the total cost of ownership of the storage system 2000 can be decreased.

FIG. 5 illustrates an example of volume character table 1115. Typical entries of the volume character table 1115 may include: volume number 11151, such as the volume ID; performance 11152, which indicates the expected performance of the volume, such as High, Middle or Low; reliability 11153, which indicates the expected reliability of the volume, such as High, Middle or Low; usage 11154, which indicates the degree of use of the volume, such as Tier1, Tier2 or backup; and availability 11155, in which a certain amount of availability is guaranteed. The parameters for performance 11152, reliability 11153 and availability 11155 may result from a SLA (Service Level Agreement) which specifies certain parameter values for certain volumes made available to certain users. Volume character table is used for all volumes that storage system 2000 manages (i.e., internal volumes 2400, external volumes 2410 and SSP volumes 2420). The entries in character table 115 may be inputted by an administrator.

FIG. 6 illustrates an example of volume management table 1112. Volume management table 1112 maintains an association between a volume identifiers used by a host computer for access protocol. For example, under SCSI protocol a host computer accesses a volume by using a LUN and WWN (worldwide name). Thus, when SCSI is used, typical parameters of volume management table 1112 are volume number 11121, LUN 11122, WWN (port ID) 11123. For other protocols, the volume management table entries may vary according to the requirements of the particular protocol being used.

FIG. 7 illustrates an example of an external volume management table 1113. External volume management table 1113 resides on the management computer 1100, but may also or alternatively reside on storage system 2000 in some embodiments, and is used for managing any external volumes 2410 corresponding to any external storage systems in communication with storage system 2000, as will be discussed further below. External volume management table 1113 includes a volume number field 11131 for the volume number of virtual external volume 2410 in the storage system 2000, an external logical unit number (LUN) 11132 for an actual external volume on the external storage system that corresponds to the virtual volume number on the storage system 2000, and WWN 11133 for the port on the external storage system used to access the actual external volume.

FIG. 8 illustrates an example of SSP volume management table 1114 that resides in the management computer 1100, but may also or alternatively reside on storage system 2000 in some embodiments. Typical entries of the table include: SSP volume number 11141, which is the volume number of the virtual volume used by the storage system 2000; SSP space ID 11142, which may be used by the storage system to keep track of SSP storage space; WWN of an external port 11143 through which the SSP is accessed; capacity 11144 provided by the volume; network address of SSP (i.e., URL) 11145; user name 11146 for SSP login; password 11147 for SSP login; and the like.

FIG. 9 illustrates an example of a SSP layout management table 2303 that resides in storage system 2000. SSP layout management table includes entries for the SSP volume number 23031, which is the volume number used by the storage system 2000 to identify the virtual SSP volume 2420 in storage system 2000; WWN 23032, LUN 23033, LBA 23034, which is the logical block address used to designate the location of files on the SSP volume 2420; and file name 23035, which is the file name associated with the LBA 23034. Thus, SSP layout management table provides for mapping a LBA 23034 (used by the host computer when reading or writing data) to a corresponding file name 23035 that is used when storing or retrieving the data on the SSP storage capacity 3200. In the configuration illustrated, there is one file on the SSP that corresponds to each LBA in the SSP volume. However, other mapping configurations could also be used. For example, a particular number of LBAs may correspond to each file on the SSP, such as LBA 0-LBA 3 of a volume might correspond to a first file and LBA 4-LBA 7 of the volume might correspond to the next file, and so on, depending on particular system configurations. Also, the use of LBAs is not mandatory. For example, in an alternative embodiment, a LUN could be mapped to a file name 23035. An advantage of designating a single LBA per file is that greater granularity is enabled, so that when an update is made to a single LBA by the host, the data for that LBA can be easily updated by storing the update data to the corresponding file.

SSP Volume Creation

In order to utilize SSP capacity as a storage volume, obtaining a subscription for the SSP capacity and mapping the capacity to the storage volume need to take place. SSP volume creation can be performed either right before the path definition described in the next section or at some other point prior to the path definition. The price and conditions of the subscription might decide the timing of volume creation. For example a lower price makes the advanced subscription more attractive, whereas if the charges are time based, it may be more desirable to wait until the capacity is actually required.

Figure 10:
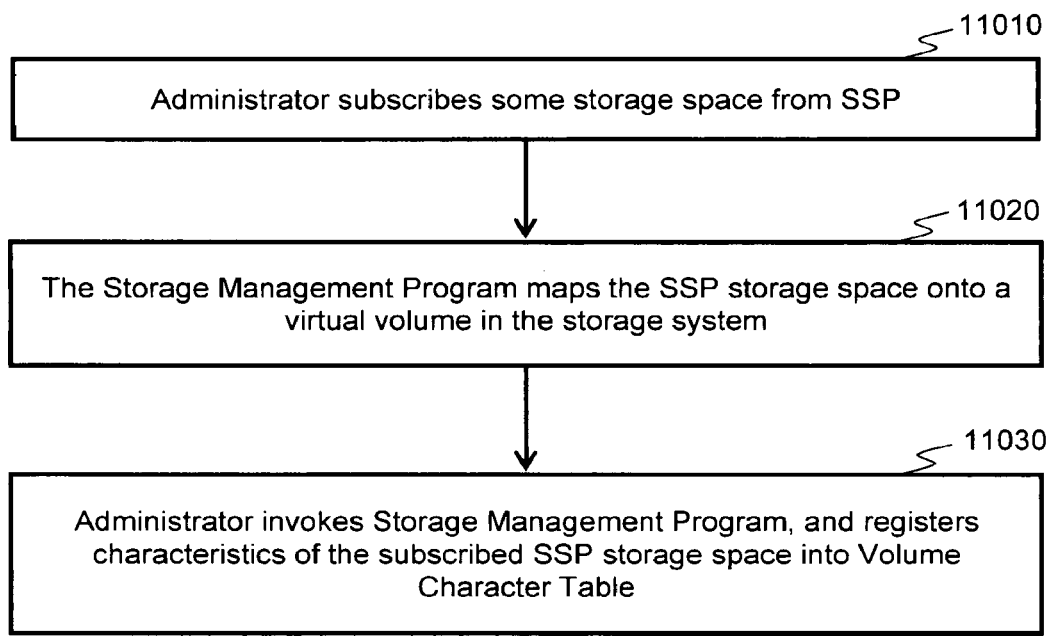
FIG. 10 illustrates an example of a process for SSP volume creation.

FIG. 10 illustrates a typical control procedure for creating a virtual volume (SSP volume 2420) and mapping the subscribed SSP capacity 3200 to the virtual SSP volume 2420.

Step 11010: An administrator subscribes some amount of storage space from SSP 3000. Although the subscription is typically performed manually by the administrator, the storage management program 1111 can also carry out this function automatically by using an API provided by SSP 3000 in cases where the SSP 3000 provides an API. In the case where this step is performed manually, the administrator invokes the storage management program 1111 and inputs necessary parameters in order to subscribe to a certain amount of capacity. The typical parameters are the amount of storage space needed, address of the SSP 3000, user name for accessing the storage capacity, password, and the like.

Step 11020: An administrator invokes the storage management program 1111 to perform mapping. The storage management program 1111 maps the SSP storage capacity 3200 onto a SSP virtual volume 2420 in the storage system 2000. The SSP virtual volume 2420 residing in the storage system 2000 and mapped to the SSP storage space (hereafter SSP volume 2420) can be allocated before this procedure or can be created at this procedure. The storage management program 1111 issues an ID for the SSP storage space. Any unique ID can be used. One example is a timestamp or sequential number managed by the storage management program 1111. The mapping procedure includes registering the association between the SSP storage space ID and the SSP volume number into the SSP volume management table 1114.

Step 11030: An administrator invokes the storage management program 1111, and registers characteristics of the subscribed SSP storage space 3200 into the volume character table 1115. Typical registration parameters are SSP volume number 11151, usage 11154 (e.g. tier1, tier2, backup, etc.), and SLA information such as performance 11152 (e.g. high, mid, low), reliability 11153 (e.g. high, mid, low), availability 11155 (e.g. 99.999%, 99.99%, 99.9%), and the like. The parameters except for the volume ID can be inputted by the administrator. When the SSP storage space subscription is performed by the storage management program 1111, some of these parameters are entered automatically, and do not have to be inputted by the administrator.

Path Definition To SSP Volume

Figure 11:
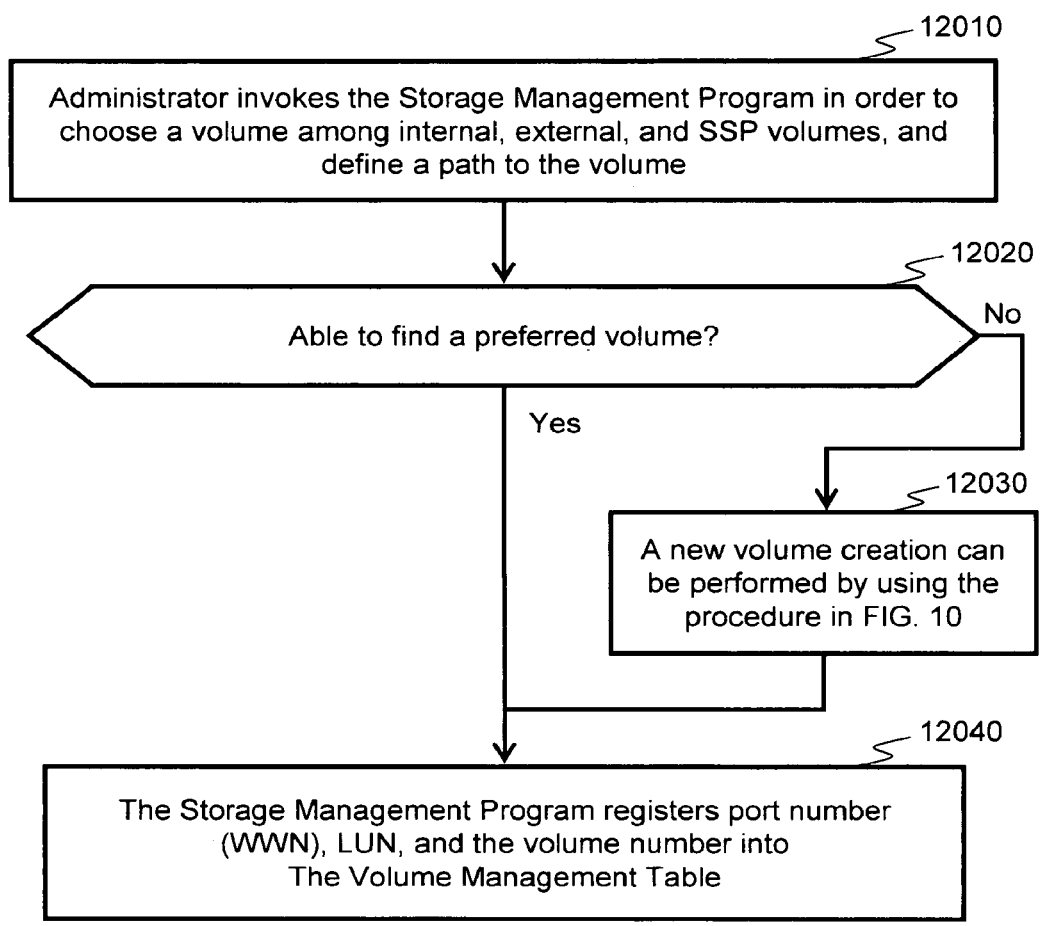
FIG. 11 illustrates an example of a process for defining a path to the SSP volume.

In order for host computer 1000 to discover volumes, a path to the volumes needs to be defined. FIG. 11 illustrates an example of control procedure to define a path to the SSP Volume.

Step 12010: An administrator invokes the storage management program 1111 in order to choose a volume among internal, external, and SSP volumes, and define a path to the volume. The storage management program 1111 illustrates the entries in the volume character table 1115. Then, the administrator can choose a preferred volume from among available internal, external and SSP volumes. The process may also be automated by the storage management program. For example, the administrator can input several preferred characteristics of a volume, and the storage management program 1111 can choose a volume from the volume character table 1115 based on some policy.

Step 12020: If a preferred volume is located, the process goes to step 12040. However, if the administrator wants to use a SSP volume, and a SSP volume is not available, the process goes to Step 12030.

Step 12030: Creation of a new SSP volume can be performed by using the procedure in FIG. 10 described above.

Step 12040: The administrator inputs a port number or WWN, and LUN for the chosen volume. The storage management program 1111 registers the inputted parameters and the volume number into volume management table 1112. If necessary, the administrator sets LUN security and zoning for the volume. After finishing the above operations, a host computer 1000 can discover and mount the volume provided by the storage system 2000.

Since the above procedure is typically used for a planned volume allocation such as for a backup volume, an administrator invokes the operations. However, when an unplanned volume allocation is needed such as upon the occurrence of a storage capacity shortage in a thin provisioned volume, the storage management program 1111 of the invention is able to allocate a SSP volume dynamically to address the capacity shortage. In this case, if the administrator gives such permission to the storage management program 1111, the storage management program 1111 can automatically create a new SSP volume, and define a path to the new SSP volume by using the procedures of FIGS. 10 and 11.

WRITE Access To SSP Volumes

Figure 12A:
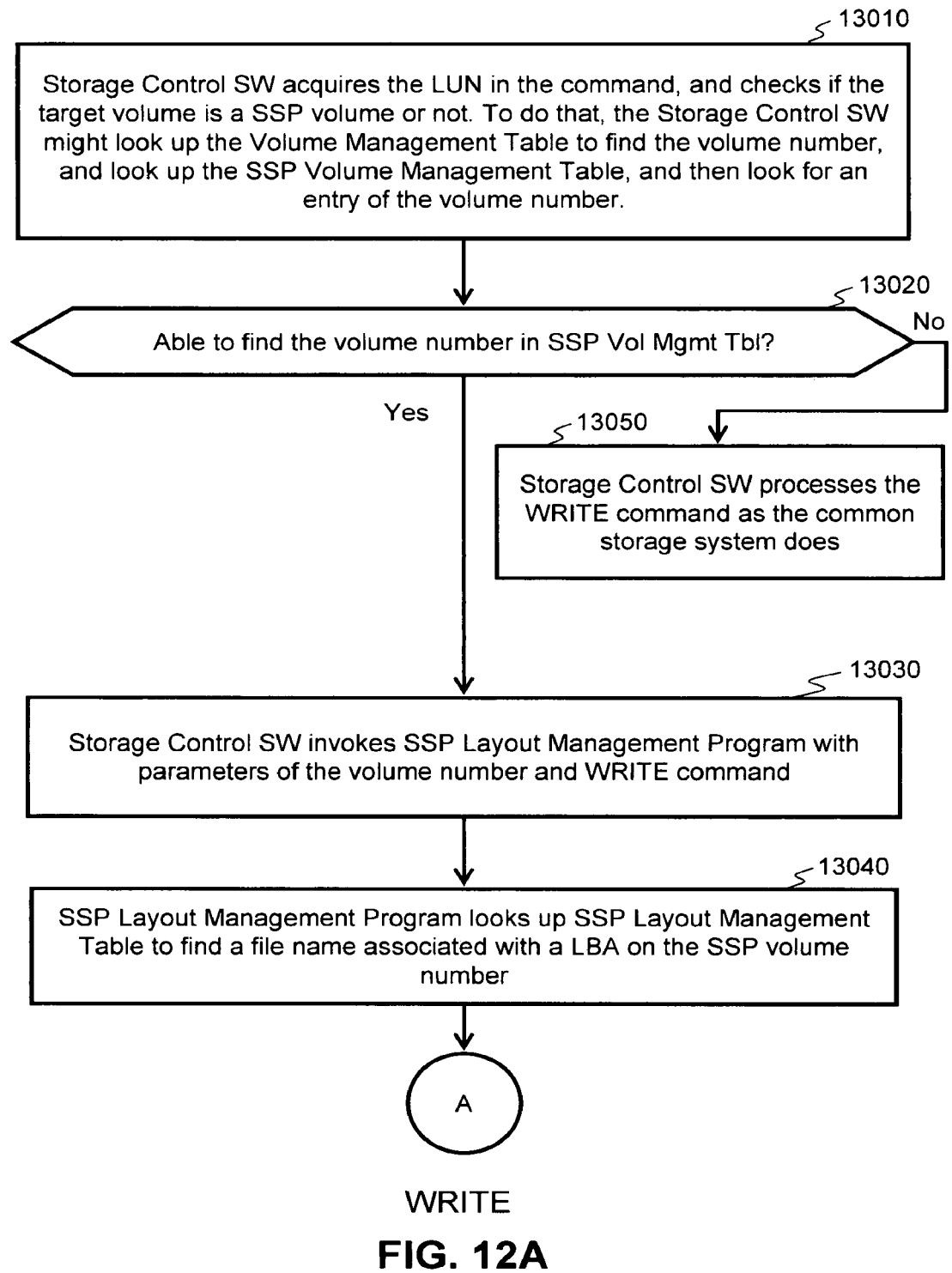
FIGS. 12A-12B illustrate an example of a control procedure for the host computer to write data on the SSP volume.
Figure 12B:
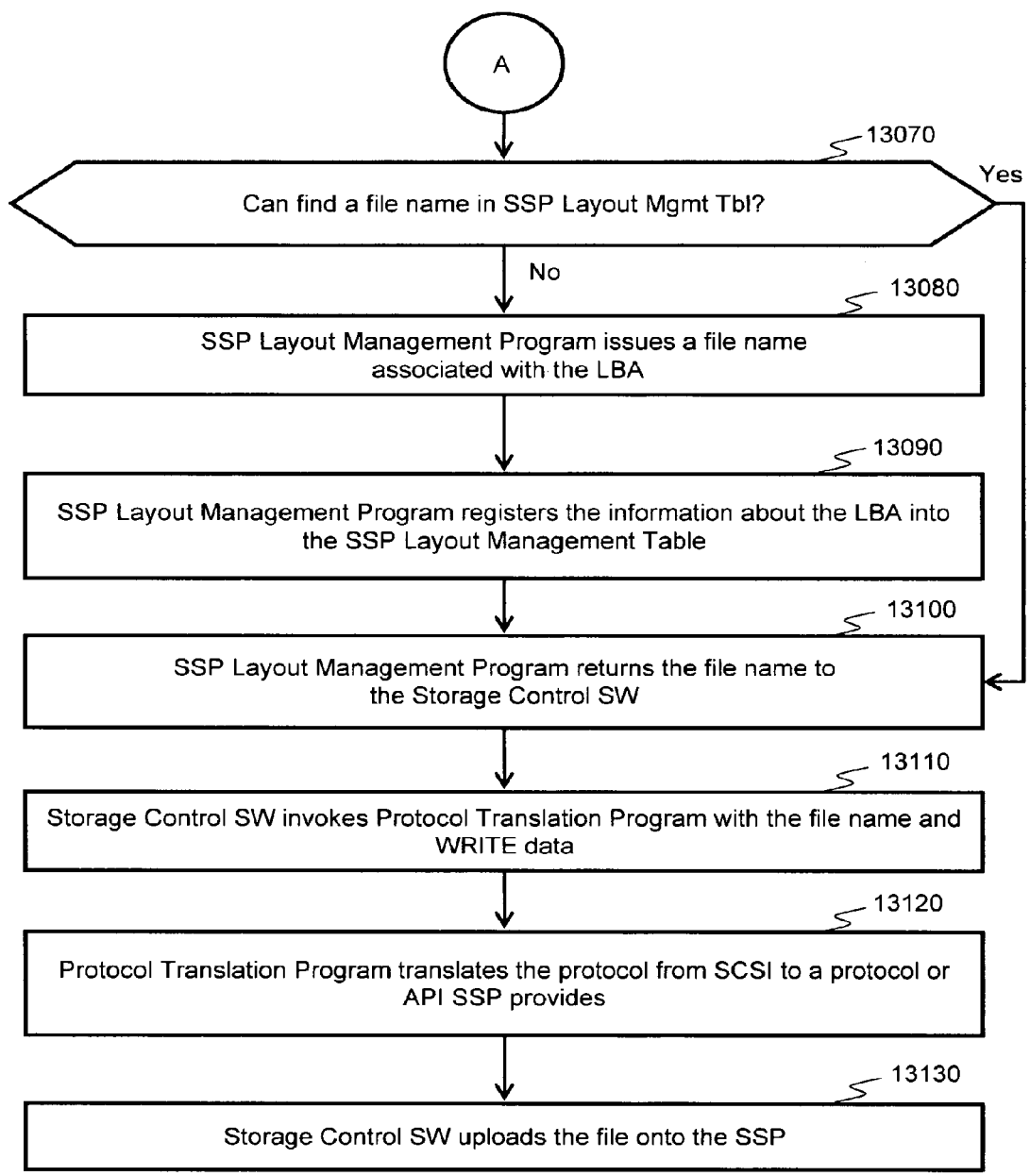

Under the invention, there is no need for AP 1011 to change its access method when accessing SSP volumes, and thus, AP 1011 is able to access SSP volumes 2420 in the same manner as accessing the other volumes such as internal volumes 2410 and external volumes 2420. FIGS. 12A-12B illustrate an example of a control procedure for host computer 1000 to write data to a SSP volume 2420. Typically, AP 1011 on host computer 1000 issues a write operation, and then OS 1012 on host computer 1000 issues a SCSI WRITE command that is sent to storage system 2000 over network 5000. Storage control SW 2301 on storage system 2000 receives and processes the WRITE command. If storage system 2000 employs a write-through cache mechanism, the following operations are done immediately. If the storage system employs a write-back cache mechanism, the WRITE data is written on the cache, and the following operations are done during a cache data flush phase.

Step 13010: Storage control SW 2301 acquires the LUN included in the WRITE command, and checks whether the target volume is a SSP volume or not. To do that, the storage control SW 2301 might look up the volume management table 1112 to find the volume number, refer to the SSP volume management table 1114, and then look for an entry of the volume number. If the tables are not located on the memory or hard disks on the storage system 2000, the storage control SW looks up the tables on the management computer 1100.

Step 13020: If the volume number is found in the SSP volume management table 1114, this means the volume is a SSP volume. If the volume is a SSP volume the process continues to Step 13030. However, if the volume is not a SSP volume, then the process goes to Step 13050.

Step 13030: Storage control SW 2301 invokes SSP layout management program 2302 including parameters of the volume number and WRITE command.

Step 13040: The SSP layout management program 2302 refers to SSP layout management table 2303 to find a file name associated with the LBA included in the WRITE command on the SSP volume number identified in Steps 13010 and 13020.

Step 13050: When the volume specified in the WRITE command is not a SSP volume (i.e., the volume number is not found in the SSP volume management table), this means that the volume is either an internal or external volume, and then the storage control SW processes the WRITE command in the same manner as a conventional storage system.

Step 13070: Referring to FIG. 12B, the storage control SW determines whether a file name was already associated with the LBA in SSP layout management table 2303. When the file name is NOT found in the SSP layout management table 2303, this means that this is the first write operation to the specified LBA, and the process goes to Step 13080. On the other hand, if there is already a file name associated with the specified LBA, then this means the write operation is an overwrite (e.g., update) operation, and the process skips to step 13100.

Step 13080: The SSP layout management program 2302 issues a file name to be associated with the specified LBA. The file name is preferably unique in the SSP, but the method for creating the file name does not restrict the invention. One example of a file name creation method is to use the external port ID, LUN, and LBA as a file path name. When the SSP uses an interface other than a file system interface, the SSP layout management program can issue some other appropriate format for associating the specified LBA with a storage location on the SSP.

Step 13090: The SSP layout management program 2302 registers the information about the specified LBA into the SSP layout management table 2303.

Step 13100: The SSP layout management program 2303 returns the file name created in Step 13080 or the file name found in Step 13070 to the storage control SW 2301.

Step 13110: Storage control SW 2301 invokes protocol translation program 2304 with the file name and WRITE data.

Step 13120: Protocol translation program 2304 translates the protocol from SCSI to a protocol or API SSP provides. SSPs may specify any of several different protocols mentioned above for receiving communication and data from users. Thus, the protocol translation program 2304 of the invention might support a several different protocols or APIs. For example, if the SSP uses FTP protocol, then the protocol translation program 2304 translates the SCSI WRITE command into a PUT command. If the SSP uses HTTP/1.1, then protocol translation program 2304 also translates the SCSI WRITE command into PUT command. If the SSP uses HTTP/1.0 with CGI, then protocol translation program 2304 translates the SCSI WRITE command into a POST command.

Step 13130: The storage control SW uploads the file onto the SSP, and the SSP may send a response when the process is completed. Further it should be noted that the above-described WRITE command process is exemplary, and is not intended to restrict the invention.

READ Access To SSP Volume

Figure 13A:
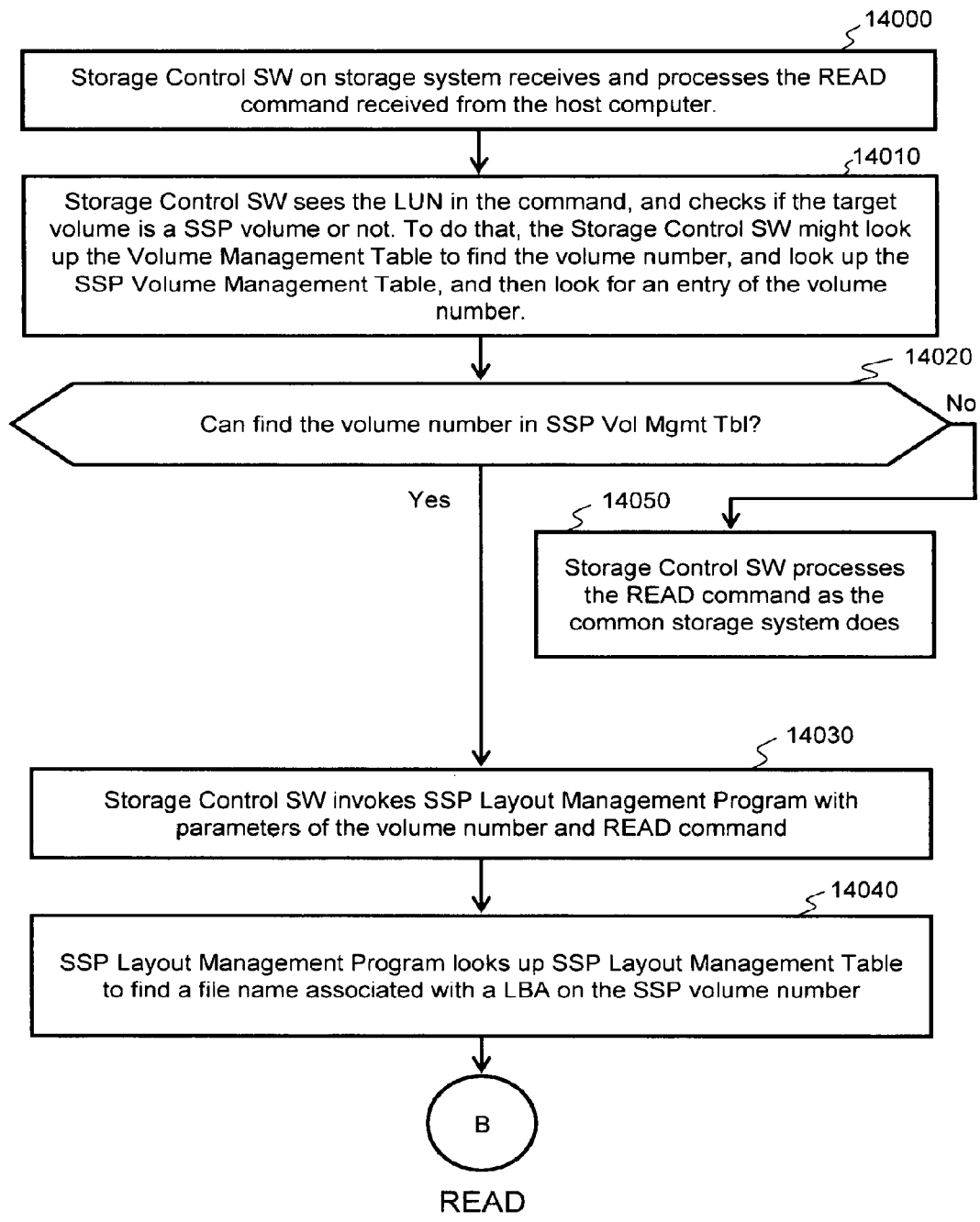
FIGS. 13A-13B illustrate an example of a control procedure for the host computer to read data on the SSP volume.
Figure 13B:
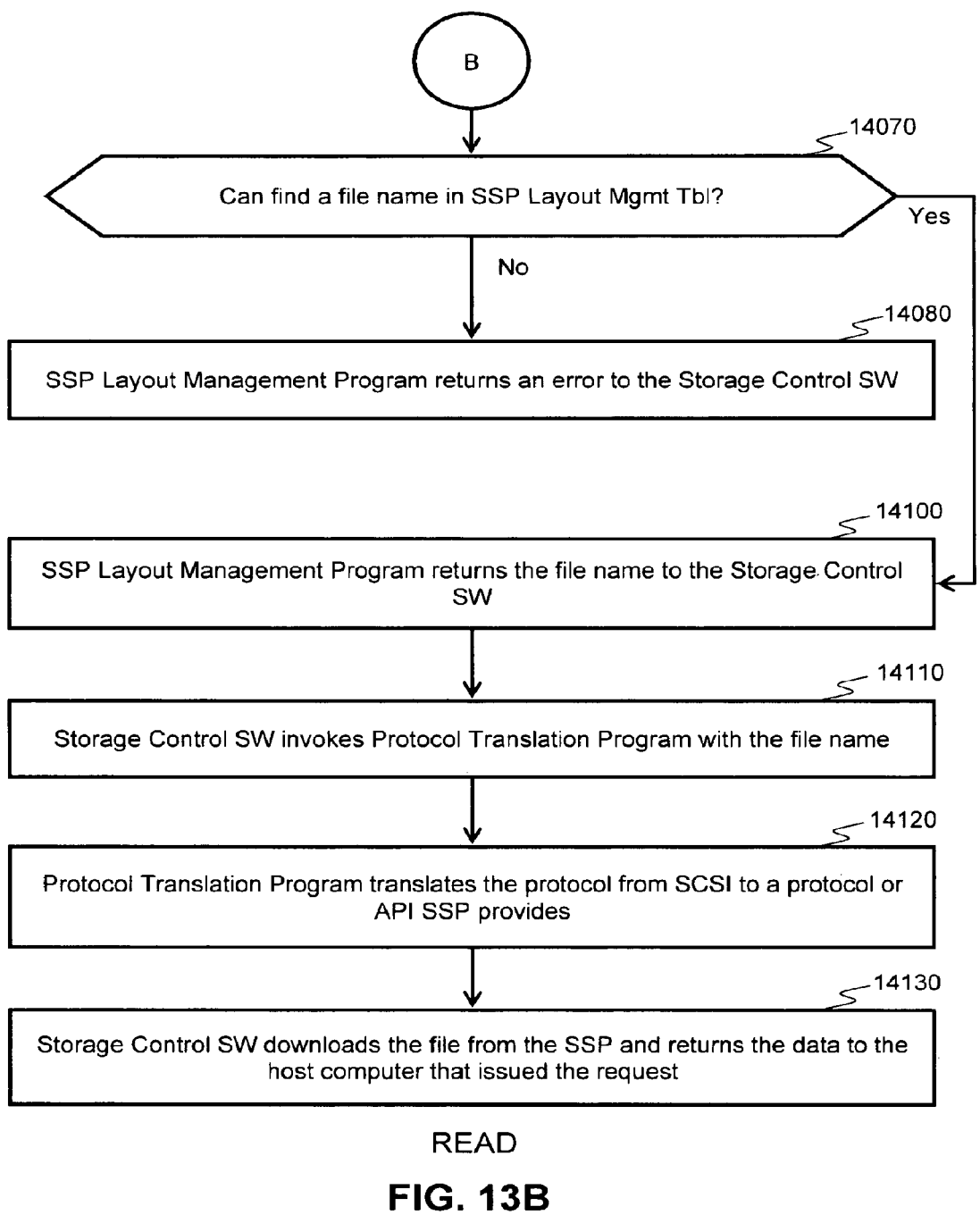

There is no need for AP 1011 on host computer 1000 to change the method used for reading data when accessing data stored on a SSP volume, as compared to the access methods for the other volumes such as internal volumes and external volumes. FIGS. 13A-13B illustrate an example of a control procedure carried out under the invention by the storage system 2000 to enable the host computer 1000 to read data on SSP volume.

Step 14000: An AP 1011 on host computer 1000 issues a read operation, and then OS 1012 on host computer issues a SCSI READ command. Storage control SW 2301 on storage system 2000 receives and processes the READ command. If the read data is on the cache 2103 of the storage system 2000, then the storage controller returns the data immediately. On the other hand, if the read data is NOT on the cache of the storage system, the storage control SW 2301 needs to read the data from a volume, and the process goes to Step 14010.

Step 14010: Storage control SW 2301 sees the LUN in the command, and checks whether the target volume is a SSP volume or not. To do this, the storage control SW might look up the volume management table 1112 to find the volume number corresponding to the LUN in the command, and refer to the SSP volume management table 1114, and then search for an entry having the volume number retrieved from the volume management table 1112. If the tables are not located on the memory or hard disks on the storage system 2000, the storage control SW looks up the tables on the management computer 1100.

Step 14020: If the volume number is found in the SSP volume management table, this means the volume is a SSP volume, and the process goes to Step 14030. On the other hand, if the volume number is not for a SSP volume, then the READ command is directed to an internal or external volume on the storage system, and the process goes to Step 14050 for processing the READ command in a conventional manner.

Step 14030: Storage control SW 2301 invokes SSP layout management program 2302 including parameters of the volume number located in Step 14010 and the READ command.

Step 14040: The SSP Layout Management Program refers to SSP layout management table 2303 to find a file name associated with a LBA specified in the READ command on the SSP volume number.

Step 14050: If the volume number is NOT found in the SSP volume management table at Step 14020, this means the volume is either an internal or external volume, and the storage control SW 2301 processes the READ command in a conventional manner.

Step 14070: Referring to FIG. 13B, when a file name is found in the SSP layout management table 2303, the process goes to Step 14100. On the other hand, if a file name is not found in the SSP layout management table 2303, then the process goes to Step 14080.

Step 14080: When the file name that correlates to the specified LBA is not found in the SSP layout management table, this indicates that there is something wrong with the READ command, and the SSP layout management program returns an error to the storage control SW 2301.

Step 14100: When the file name is located in the SSP layout management table, the SSP layout management software returns the file name to the storage control SW 2301.

Step 14110: Storage control SW 2301 invokes protocol translation program 2304 with the file name located in Step 14100.

Step 14120: Protocol translation program 2304 translates the protocol from SCSI to a protocol or API that the SSP provides. As discussed above, there may be any of several protocols or APIs used by particular SSPs to enable communication and data storage with their service. Thus, the protocol translation program 2304 is able to support any of several different protocols or APIs. For example, if the SSP uses FTP protocol, then the protocol translation program translates the SCSI READ command into a GET command. If the SSP uses HTTP/1.1, protocol translation program also translates the SCSI READ command into GET command.

Step 14130: The storage control SW 2301 downloads the data from the SSP, and then returns the data to the requesting host using SCSI format. Further, it should be noted that the foregoing READ command process is exemplary, and is not intended to restrict the invention.

SSP Volume Deletion

Figure 14:
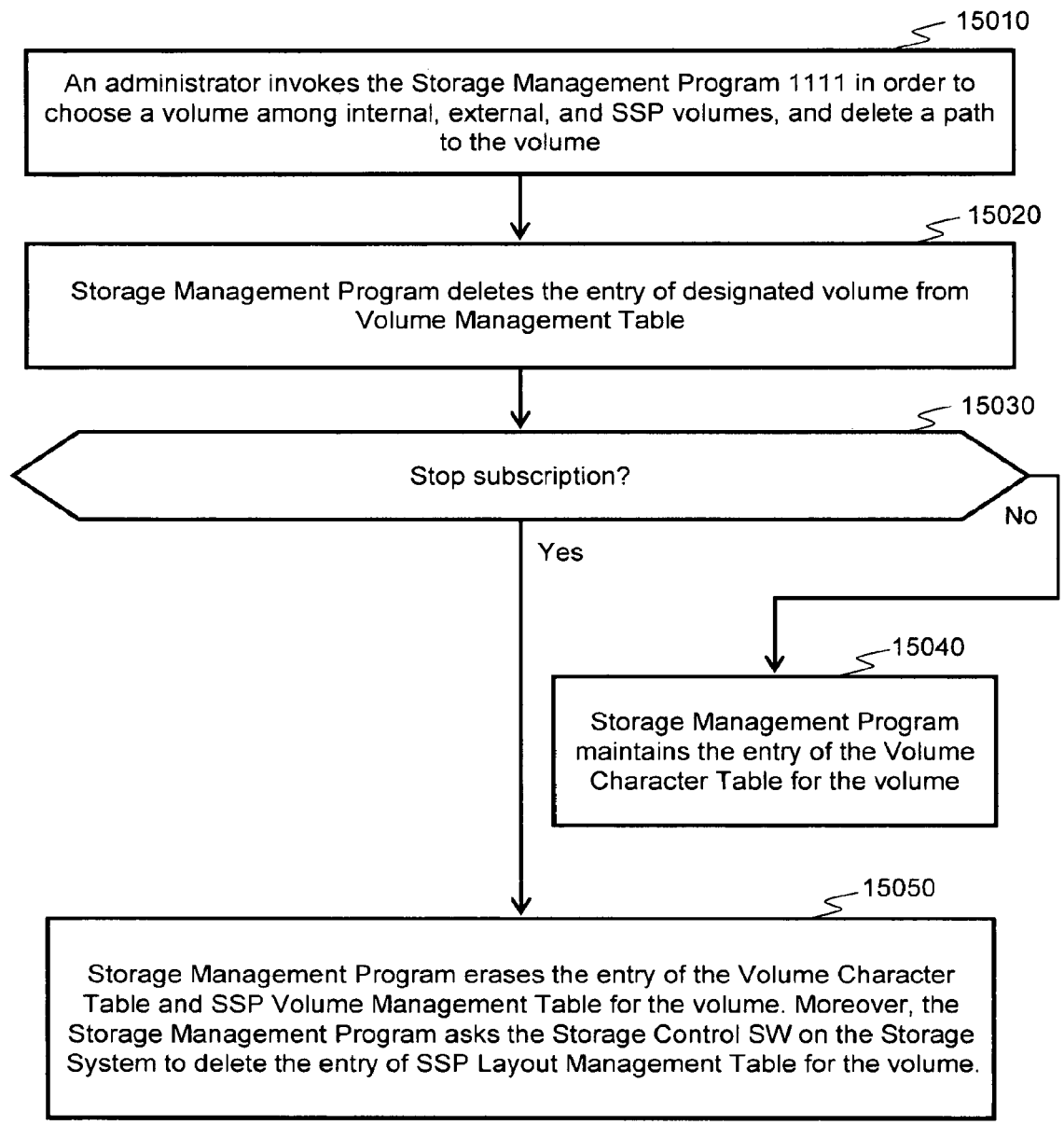
FIG. 14 illustrates an example of a control procedure to delete a path to the SSP volume.

FIG. 14 illustrates an example of a control procedure to delete a path to an SSP volume 2420.

Step 15010: An administrator invokes the storage management program 1111 in order to choose a volume from among internal, external, and SSP volumes, and delete a path to the selected volume. Through use of a graphic user interface, or the like, storage management program 1111 is able to display the current entries in volume management table 1115. Then, the administrator can select the desired volume for deletion.

Step 15020: The storage management program 1111 deletes the entry of designated volume from the volume management table 1112. Then, the path to the volume from a host computer is deleted, and the host computer can no longer discover or access the volume. If necessary, the administrator clears the LUN security and zoning for the volume.

Step 15030: Storage management program 1111 can ask the administrator if the subscription of the SSP storage space should be maintained or not.

Step 15040: If the administrator answers that the subscription should not be ended, the entry in the volume character table 1115 for the volume is maintained. In this case, the deleted volume can be reused in the future. For example, if the same host and same application will use the same volume, then it is usually sufficient to just recreate the path to the volume to enable the volume to be used again. However, if other hosts or other applications will use the volume instead, then deletion of the data in the SSP volume should typically be performed before path creation to the new host or application.

Step 15050: On the other hand, when the administrator instructs the storage management program 1111 not to keep the subscription, the entries in the volume character table 1115 and SSP volume management table 1114 for the volume are erased. Moreover, the storage management program 1111 instructs the storage control SW 2301 on the storage system 2000 to delete the entry for the volume in the SSP layout management table 2303. Then, the association between the SSP volume and the SSP storage space is also deleted. The subscription stop operation can be carried out by the administrator manually, or by the storage management program 1111 by using an API provided by the SSP. The contract terms of the subscription might decide the timing of whether to unsubscribe from the SSP. For example, a lower price, or price based on actual capacity used would make it more attractive to maintain the subscription.

iSCSI SSP

In the embodiments described above, the SSP employs FTP, HTTP, or a proprietary access protocol, and the access granularity used by the subscriber is a file, e.g., the storage system saves data corresponding to each LBA as a separate file in the SSP. This embodiment, however, is directed to the case in which the SSP employs iSCSI (Internet Small Computer System Interface) as the access protocol. In this case, the storage system 2000 can access the SSP by the granularity of blocks of data rather than as files. Thus, the storage system 2000 may use the same LBA and a LUN of a volume on the SSP to access the data, and thus, translation of LBAs to files is not required for this embodiment. However, it is not required that the same LBA and LUN be used on the SSP as for the virtual SSP volume 2420, and thus, in a variation of this embodiment, an address space used for a virtual SSP volume 2420 which is exported to a host computer by storage system 2000 can be different from the address space for a physical volume 3200 at the SSP. In this variation, SSP layout management table 2303 may include mapping information for SSP LUN and SSP LBA in place of file name 23035 to enable mapping of the address space of the virtual SSP volume 2420 with the physical volume 3200 at the SSP. Also in this case, the SSP can be seen as an external storage system connecting by iSCSI. Thus, the storage system of the invention can also be used for virtualizing an external storage system (either a local or remote external storage system) that uses iSCSI as the access protocol.

Figure 15:
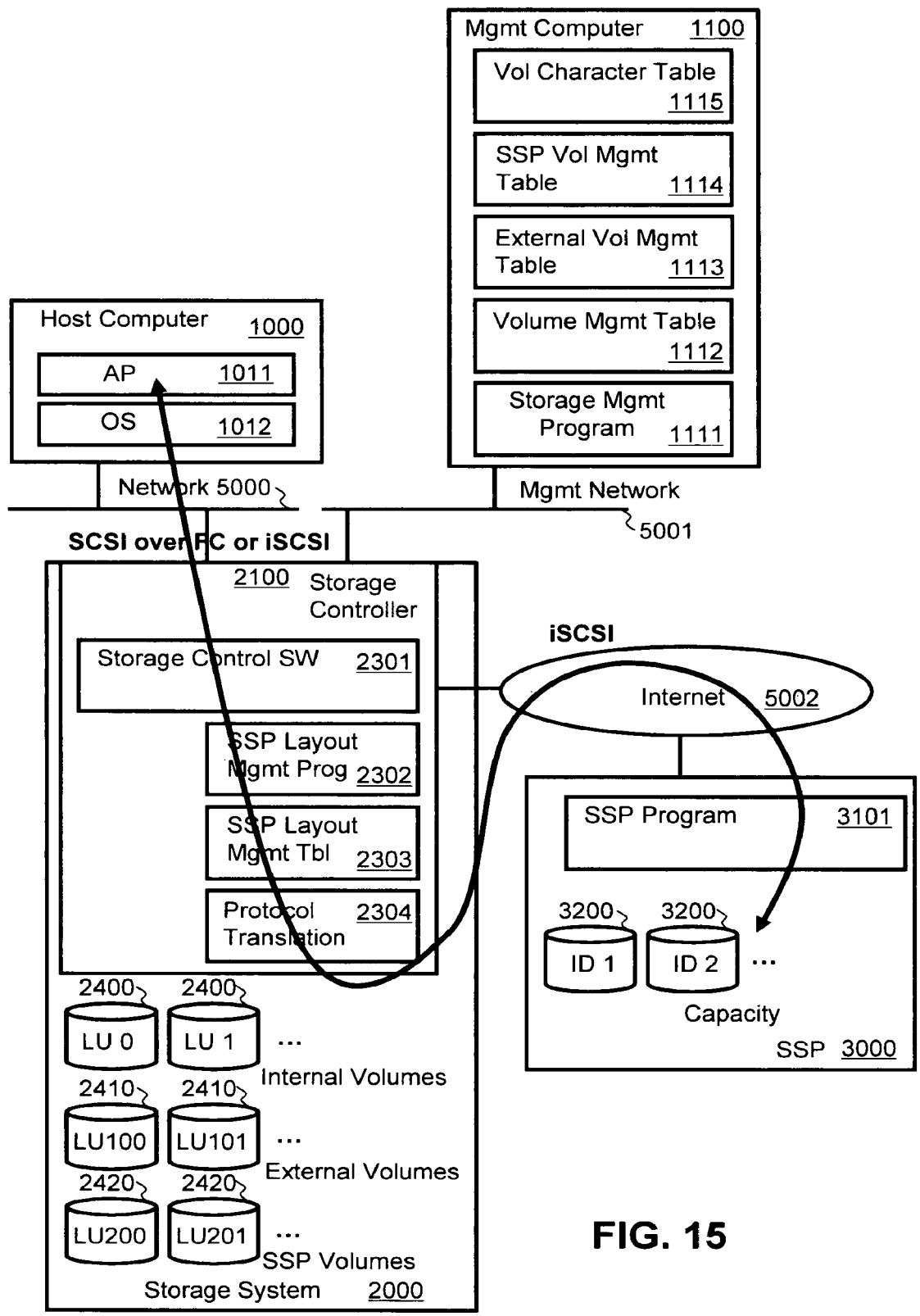
FIG. 15 illustrates a conceptual diagram of the SSP aware storage system employing iSCSI as the access protocol.

FIG. 15 represents a conceptual diagram of the operation of the SSP-aware storage system in this embodiment. There is no change in the process for creation of a SSP volume, path definition and path deletion. As for the WRITE and READ access, instead of a file path name, a LUN and LBA can be used. Then, there is no need of mapping between a LBA from host computer and a file name on the SSP. Thus, SSP layout management table 2303 would not need a File Name entry 23035 in this embodiment, but as discussed above, may include entries for SSP LBA and SSP LUN if address translation between the virtual volume 2420 and physical volume 3200 is being used. At the WRITE or READ command transmission to the SSP, protocol translation program 2304 wraps the SCSI command with an iSCSI packet.

Figure 16:
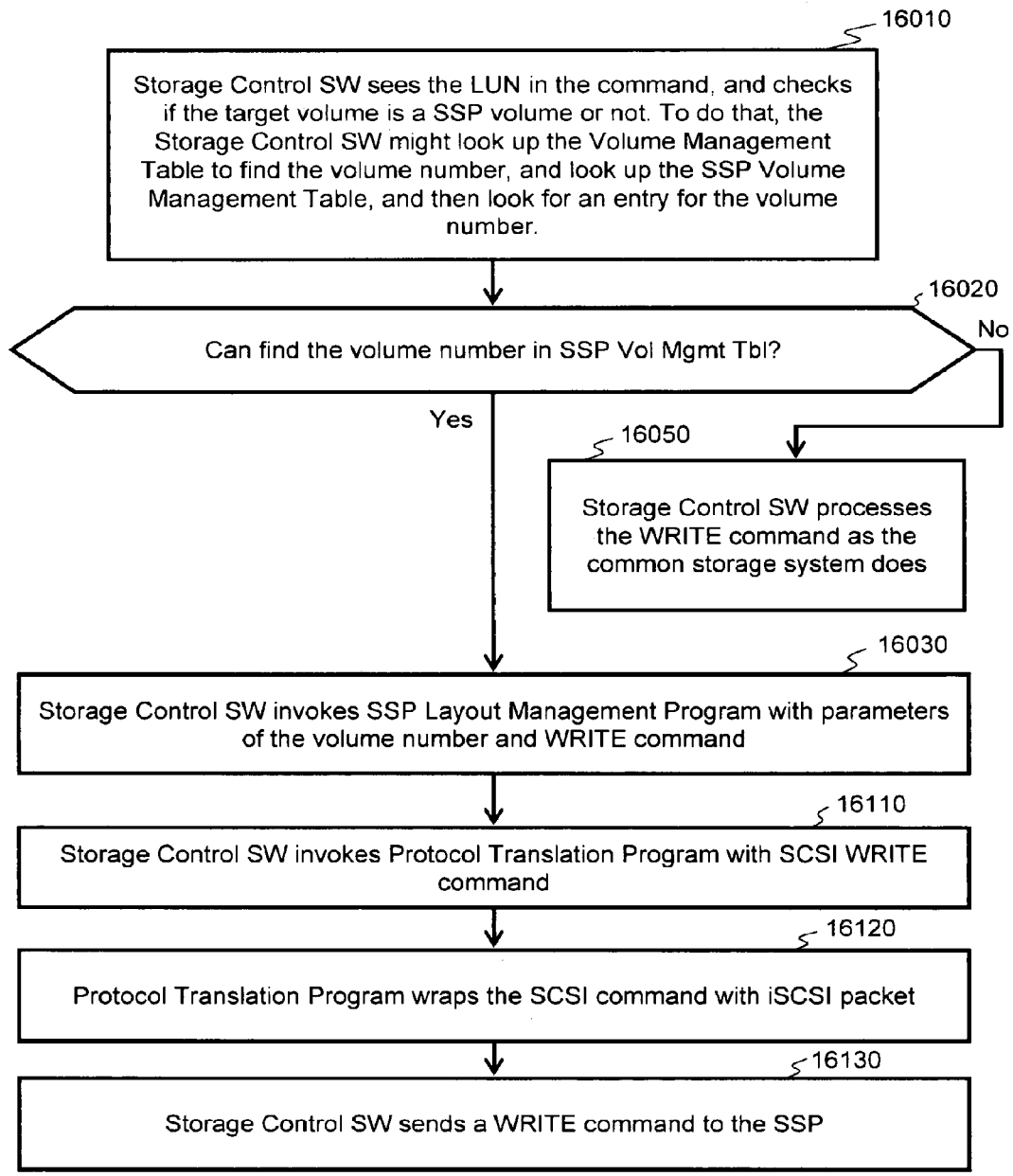
FIG. 16 illustrates an example of a control procedure for the host computer to write data to the SSP volume in the embodiment of FIG. 15.

FIG. 16 illustrates an example of a control procedure for a host computer 1000 to write data on a SSP volume 2420, with the data being actually written to a volume at SSP 3000 created from capacity 3200 and having the same LUN as SSP volume 2420. The steps required are similar in some aspects to those described in FIGS. 12A-12B, but there is no equivalent for Steps 13040 and 13070-13100, because those processes are not required in this embodiment since the LUN and LBA for the SSP volume can be transmitted to the SSP without correlating to a file on the SSP. Also, in the variation in which address translation between the virtual volume 2420 and physical volume 3200 is being used, then that address translation would take place instead of the steps for correlating to a file name.

Step 16010: Same as Step 13010 in FIG. 12A, storage control SW receives a WRITE command and determines a volume that is the target of the command.

Step 16020: Same as Step 13020 in FIG. 12A, if the volume number is found in the SSP volume management table 1114, this means the volume is a SSP volume. If the volume is a SSP volume the process continues to Step 13030. However, if the volume is not a SSP volume, then the process goes to Step 13050.

Step 16030: Same as Step 13030 in FIG. 12A, storage control SW 2301 invokes SSP layout management program 2302 including parameters of the volume number and WRITE command.

Step 16050: Same as Step 13050, when the command is targeted to an internal or external volume, the storage system treats the command in a conventional manner.

Step 16110: Layout management program storage control SW 2301 invokes protocol translation program 2304 with the SCSI WRITE command.

Step 16120: The protocol translation program wraps the SCSI WRITE command with an iSCSI packet.

Step 16130: Then, the storage control SW sends the WRITE command to the SSP using the iSCSI protocol.

Figure 17:
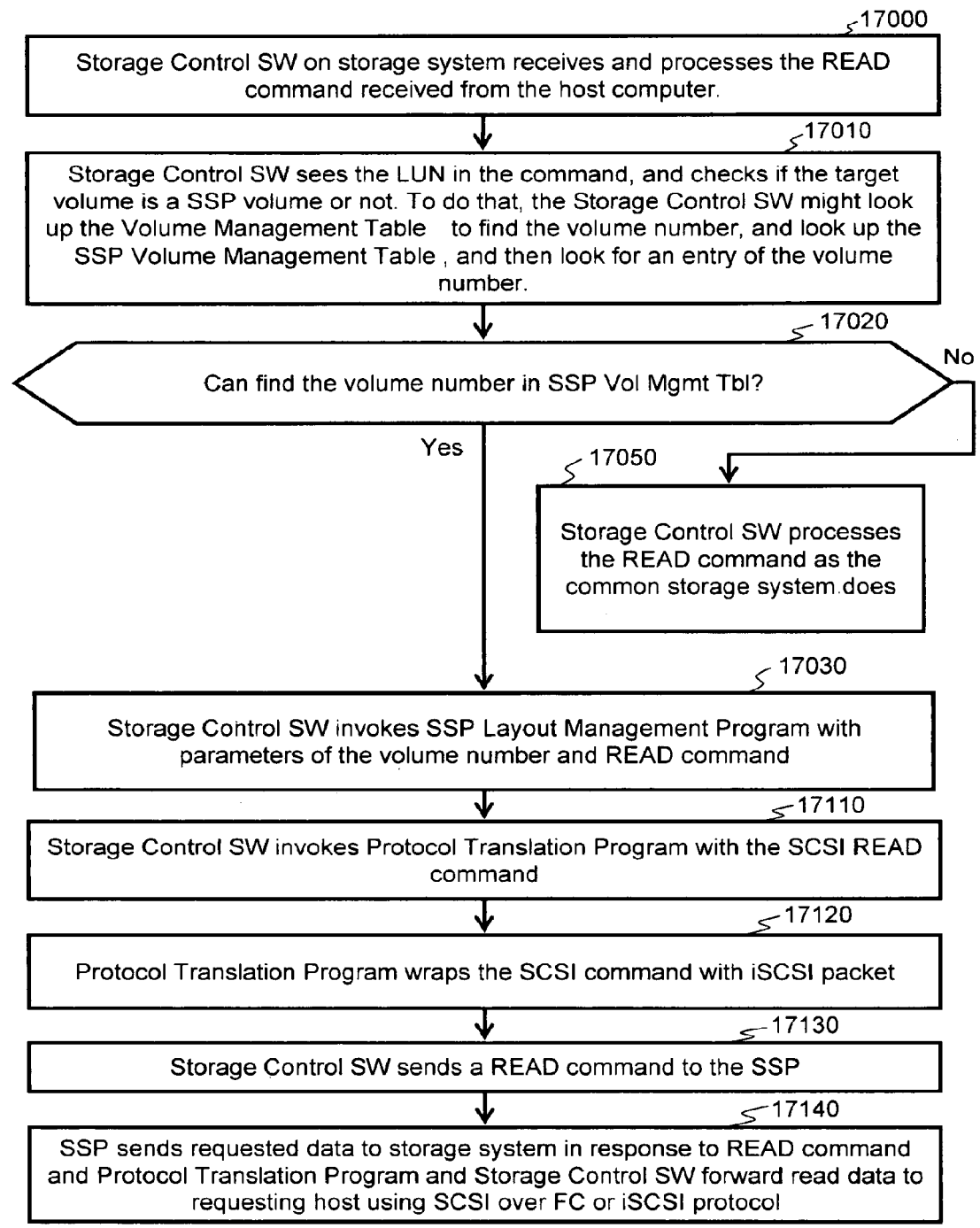
FIG. 17 illustrates an example of a control procedure for the host computer to read data on the SSP volume in the embodiment of FIG. 15.

FIG. 17 illustrates an example of a control procedure for a host computer 1000 to read data on a SSP volume 2420 in the iSCSI embodiment. Steps 17000-17030 and 17050 correspond to Steps 14000-14030 and 14050 in FIG. 13A. The steps corresponding to Steps 14040 and 14070-14100 are not needed in this embodiment because there is no need for filename-to-LBA translation since the LUN and LBA for the SSP volume can be transmitted to the SSP without file translation. Also, in the variation in which address translation between the virtual volume 2420 and physical volume 3200 is being used, then that address translation would take place instead of the steps for correlating a file name to LBA.

Step 17000: Same as Step 14000 in FIG. 13A, an AP 1011 on host computer 1000 issues a read operation, and then OS 1012 on host computer issues a SCSI READ command. Storage control SW 2301 on storage system 2000 receives and processes the READ command. If the read data is on the cache 2103 of the storage system 2000, then the storage controller returns the data immediately. On the other hand, if the read data is NOT on the cache of the storage system, the storage control SW 2301 needs to read the data from a volume, so the process goes to Step 17010.

Step 17010: Same as Step 14010 in FIG. 13A, storage control SW 2301 sees the LUN in the command, and checks whether the target volume is a SSP volume or not. To do this, the storage control SW might look up the volume management table 1112 to find the volume number corresponding to the LUN in the command, and refer to the SSP volume management table 1114, and then search for an entry having the volume number retrieved from the volume management table 1112. If the tables are not located on the memory or hard disks on the storage system 2000, the storage control SW looks up the tables on the management computer 1100.

Step 17020: Same as Step 14020 in FIG. 13A, if the volume number is found in the SSP volume management table, this means the volume is a SSP volume, and the process goes to Step 17030. On the other hand, if the volume number is not for a SSP volume, then the READ command is directed to an internal or external volume on the storage system, and the process goes to Step 17050 for processing the READ command in a conventional manner.

Step 17030: Same as Step 14030 in FIG. 13A, storage control SW 2301 invokes SSP layout management program 2302 including parameters of the volume number located in Step 17010 and the READ command.

Step 17050: Same as Step 14050 in FIG. 13A, if the volume number is NOT found in the SSP volume management table at Step 17020, this means the volume is either an internal or external volume, and the storage control SW 2301 processes the READ command in a conventional manner.

Step 17110: Storage control SW invokes protocol translation program 2304 with the SCSI READ command.

Step 17120: The protocol translation program wraps the SCSI READ command with an iSCSI packet.

Step 17130: The storage control SW sends the READ command to the SSP using iSCSI protocol.

Step 17140: The SSP sends the requested data to storage system 2000, and the protocol translation program receives the iSCSI packet, and forwards the read data using SCSI over FC or iSCSI protocol to the host that sent the READ request.

NAS SSP

Figure 18A:
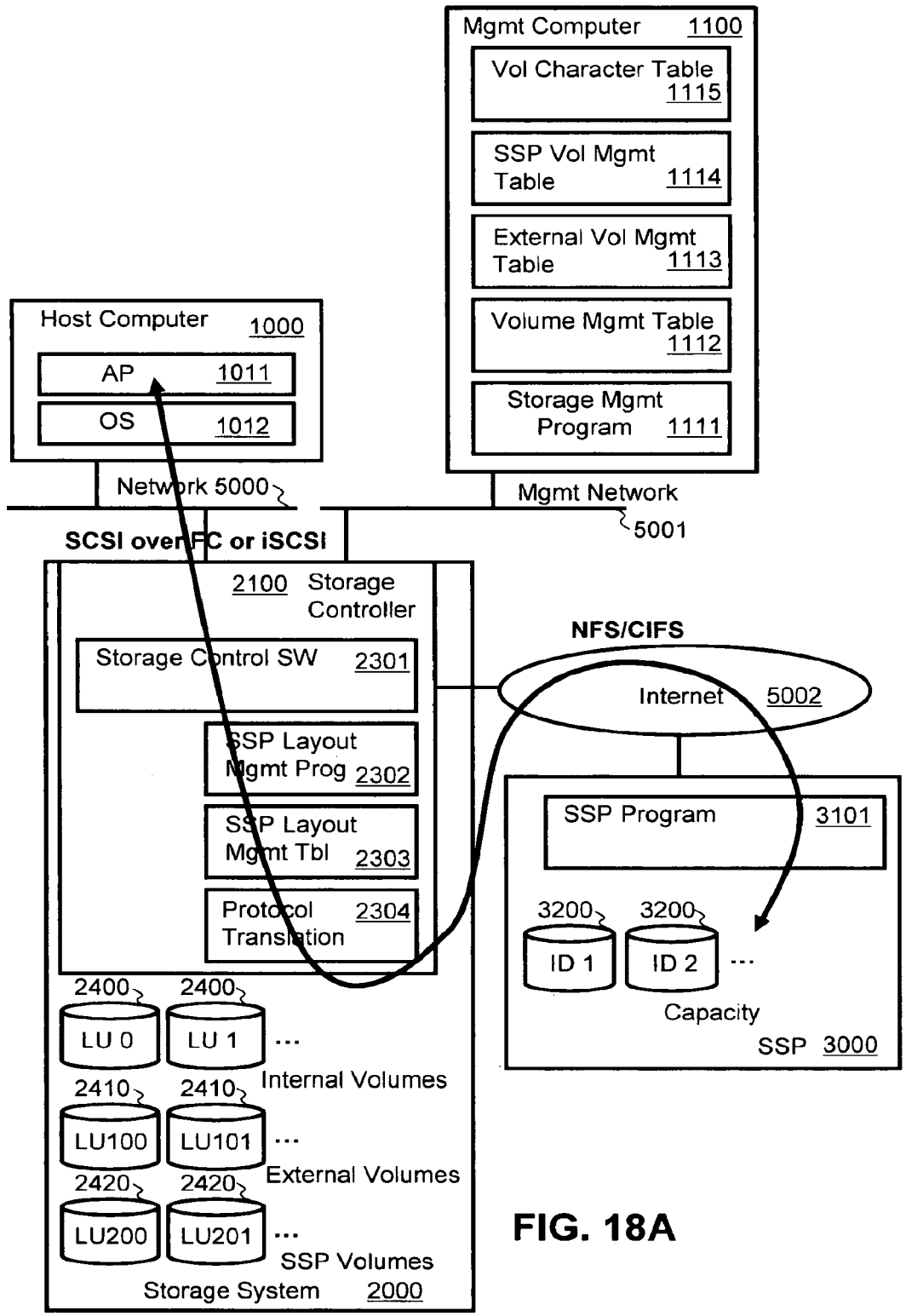
FIGS. 18A-18B illustrate conceptual diagrams of the SSP-aware storage system in the case that the SSP employs a NAS system.

There other possible SSP access protocols able to be used with the embodiments of FIGS. 1-14, which are the NFS/CIFS file-based protocols (Network File System/Common Internet File System) normally used with a NAS (Network Attached Storage) system. FIG. 18A represents a conceptual diagram of the SSP-aware storage system 2000 of an embodiment that includes the case in which the SSP employs NFS/CIFS file-based protocols. The storage system 2000 accesses the SSP by the granularity of a file, as with the embodiments of FIGS. 1-14. In this embodiment, there is no change in the processes for creation of a SSP volume, path definition and path deletion from the first embodiments of FIGS. 1-14 described above. Moreover, for the WRITE and READ access procedures, the protocol translation program 2304 translates the protocol from SCSI to NFS/CIFS protocol in Step 13120 of FIG. 12B and Step 14120 of FIG. 13B, respectively. Otherwise, there is no other change from the procedures set forth in FIGS. 12A-12B and 13A-13B, as discussed above.

Use Case of iSCSI Or NAS External Storage Space

In the embodiments set forth in FIGS. 15-18A, the SSP can be seen as an external storage with iSCSI or NAS. Thus, the storage system 2000 of the invention can also be utilized for iSCSI storage or NAS virtualization, as illustrated in FIG. 18B. NAS and iSCSI are more popular for use in some remote sites than FC storage. Also, there may be residual capacity in an external storage system which it would be advantageous to utilize. Moreover, block access is a common storage access method for virtual machine programs, such as VMWare available from VMWare Inc., of Palo Alto, Calif., though file-based access can alternatively be employed.

Figure 18B:
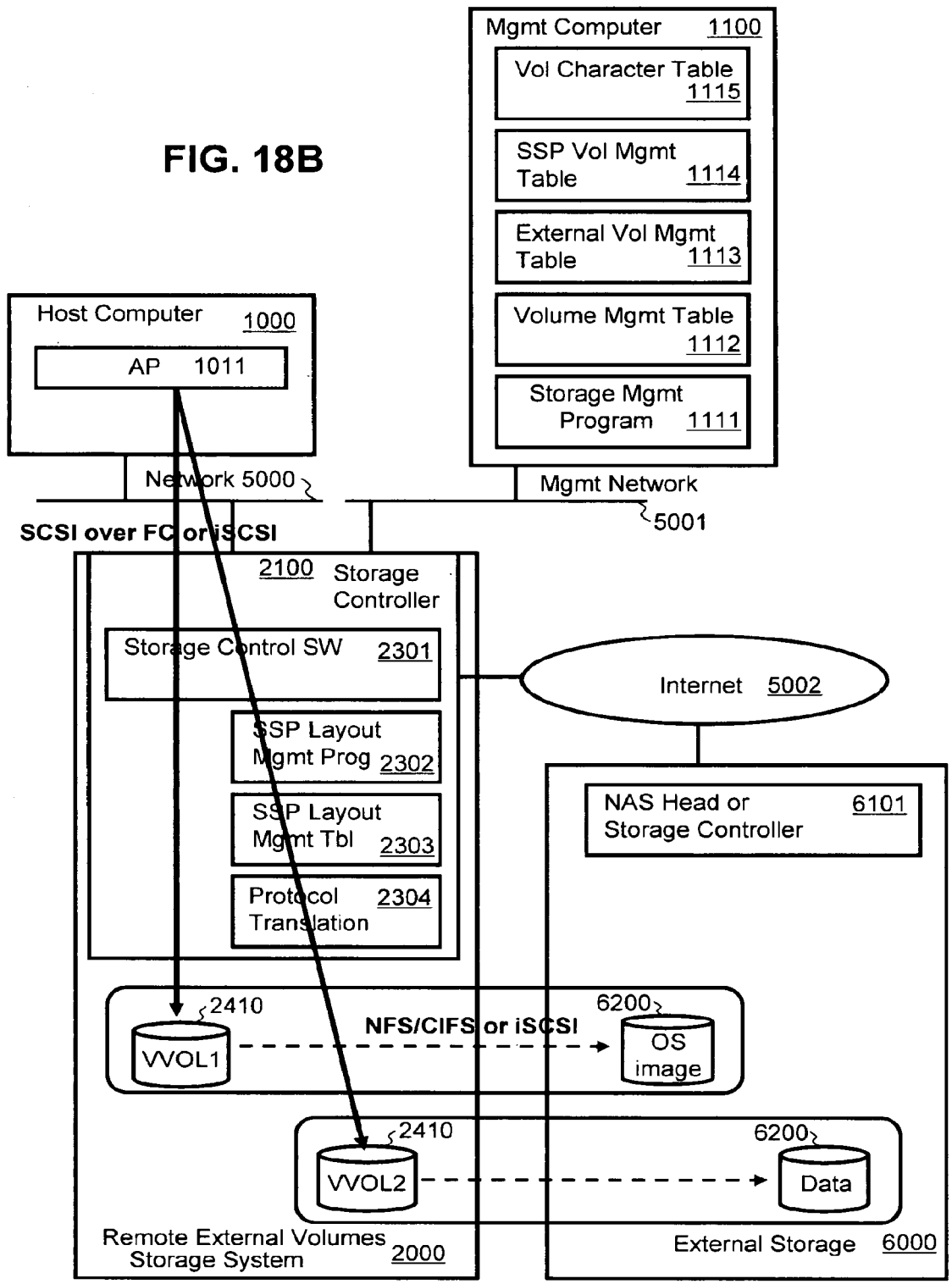

FIG. 18B illustrates a conceptual diagram of this embodiment. In the example illustrated in FIG. 18B, the virtualization and translation mechanism of the invention is utilized with an external storage system 6000 having a NAS head or storage controller 6101 and storage volumes 6200. External volumes 2410 in storage system 2000 are virtual volumes mapping to volumes 6200 in external storage system 6000. As an example, an OS image or data of a virtual server (which may, for example, be created using VMWare) can be located on the external storage 6000 at a remote site over the Internet 5002 or at a local site on a local network. As with the embodiments of FIGS. 15-17, the host computer is able to access virtual external volumes 2410 using LBAs and LUNs, or the like. The storage system 2000 may use the same LBA and LUN to access the external volume 6200 on the external storage system 6000, and thus, translation of LBAs to files is not necessarily required for some variations of this embodiment, but may take place in other variations, as discussed above with respect to FIGS. 15-17 in which address translation is used. However, there may be some delay caused by accessing the external storage system 6000 at the remote site. This can be minimized by the storage system 2000 in the local site virtualizing the external storage, and then the cache of the storage system 2000 can be used to access the remote data more quickly in many situations. Further, it may not be necessary to virtualize the remote external storage volumes 6200 forever. When the OS image and data are needed, the remote volumes can be attached to a host directly on demand using path redefinition. When the OS image and data are finished being used, the remote volumes can be detached (e.g., the path information is deleted), such as when the host will no longer need to use the volumes. Further, it should be noted that the external storage system 6000 is not necessarily located in a remote location.

NAS-Based SSP Aware Storage System

Another example of a hardware architecture in which the invention may be implemented is a NAS-based system. There are two possible configurations of NAS-based SSP-aware information systems: (1) a NAS head combined with SSP aware storage system 2000, as described above with reference to FIG. 1; and (2) a SSP-aware NAS with an conventional SSP-unaware storage system.

NAS Head With SSP-Aware Storage System

Figure 19:
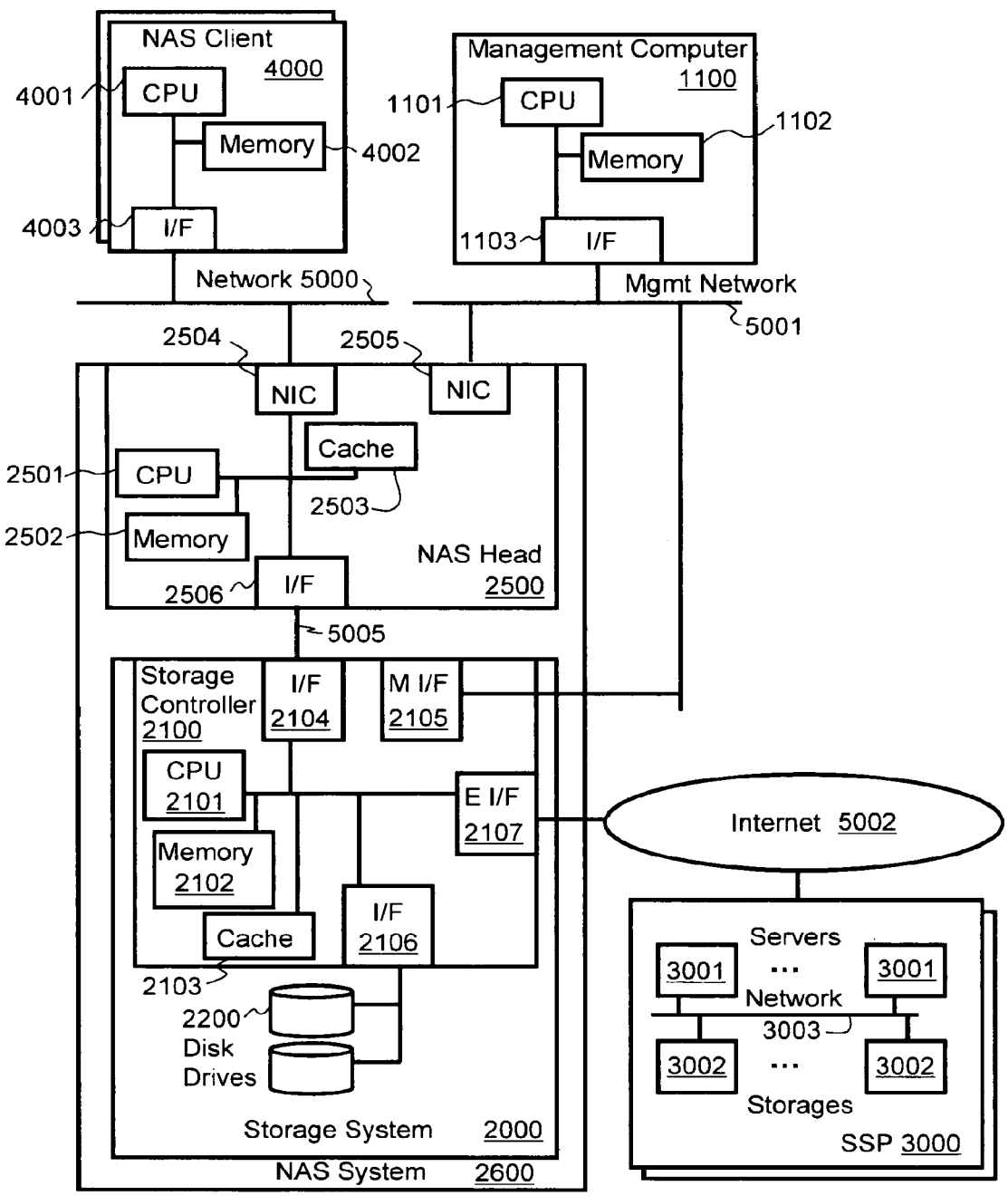
FIG. 19 illustrates an exemplary hardware configuration of the second embodiments of the invention in which the SSP-aware storage system includes a NAS system.

In the first configuration, as illustrated in FIG. 19, a NAS system 2600 includes a NAS head 2500 in communication with SSP-aware storage system 2000 that was described above with reference to FIGS. 1-18B. NAS head 2500 connects to the SSP-aware storage system 2000 via a connection 5005, such as a network (e.g., Fibre Channel, Ethernet, and so on) or a system bus (e.g., PCI, PCI-X, PCI-Express, or the like) for file serving. NAS head 2500 includes a CPU 2501, a memory 2502, a cache 2503, a first NIC 2504 for communicating with network 5000, a second NIC 2505 for communicating with management network 5001, and an interface 2506 for communicating via connection 5005 with interface 2104 on storage system 2000.

In this embodiment, the host computers 1000 are replaced by one or more NAS clients 4000. Each NAS client 4000 includes a CPU 4001, a memory 4002 and an interface 4003 for enabling communication via network 5000.

Figure 20:
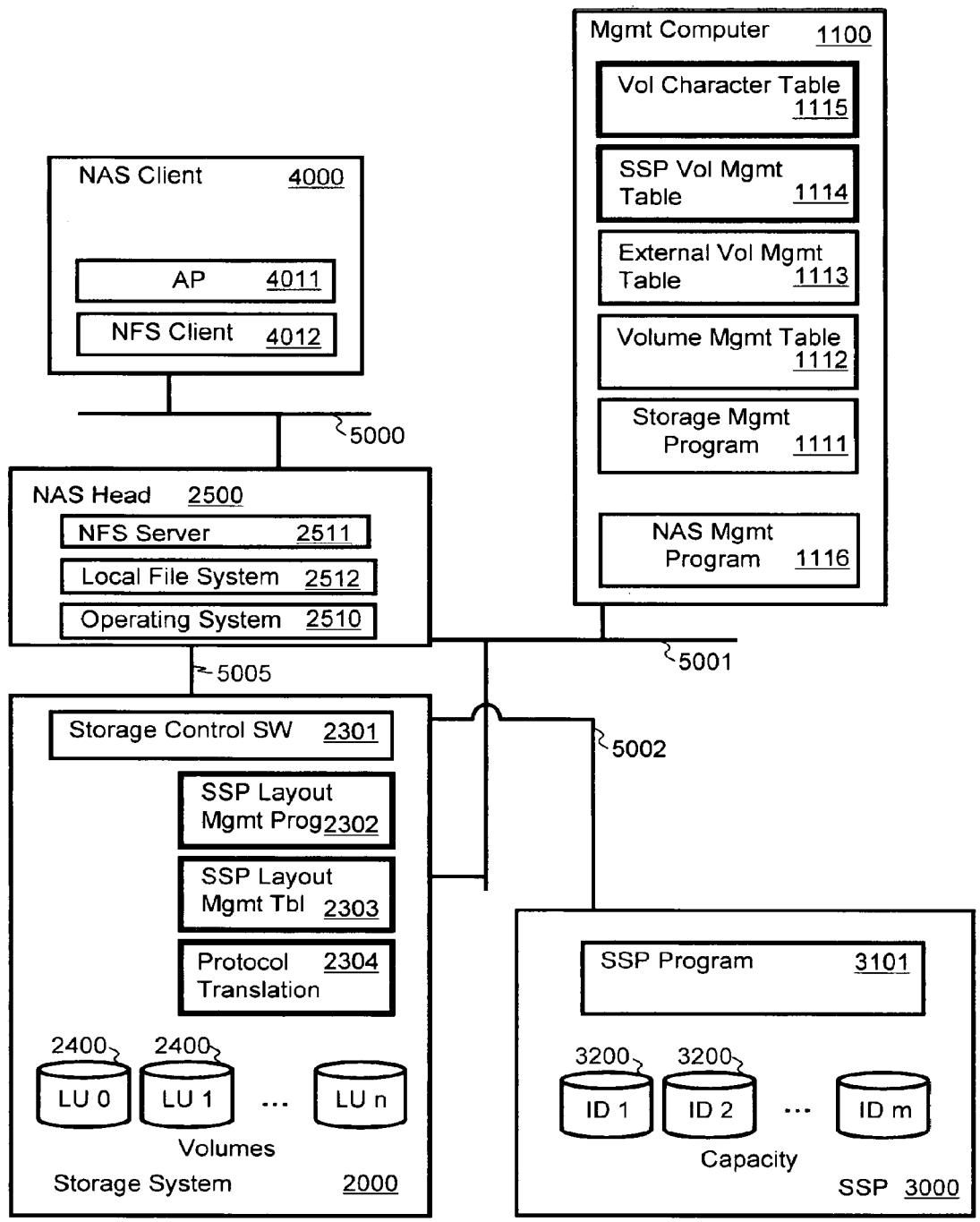
FIG. 20 illustrates an exemplary software configuration implemented on the hardware configuration of FIG. 19.

A typical software configuration of the embodiment of FIG. 19 is illustrated in FIG. 20. Each NAS client 4000 includes an application 4011 and a NFS client software 40012 that enables NAS client 4000 to access SSP-aware NAS 2600 via a file interface, such as through NFS or CIFS protocols, instead of using the block-based access discussed above. NAS head 2500 includes NFS server software 2511, a local file system 2512 and an operating system 2510. The software configurations for storage system 2000 and management computer 1100 are the same as described above with respect to FIG. 2.

Figure 21:
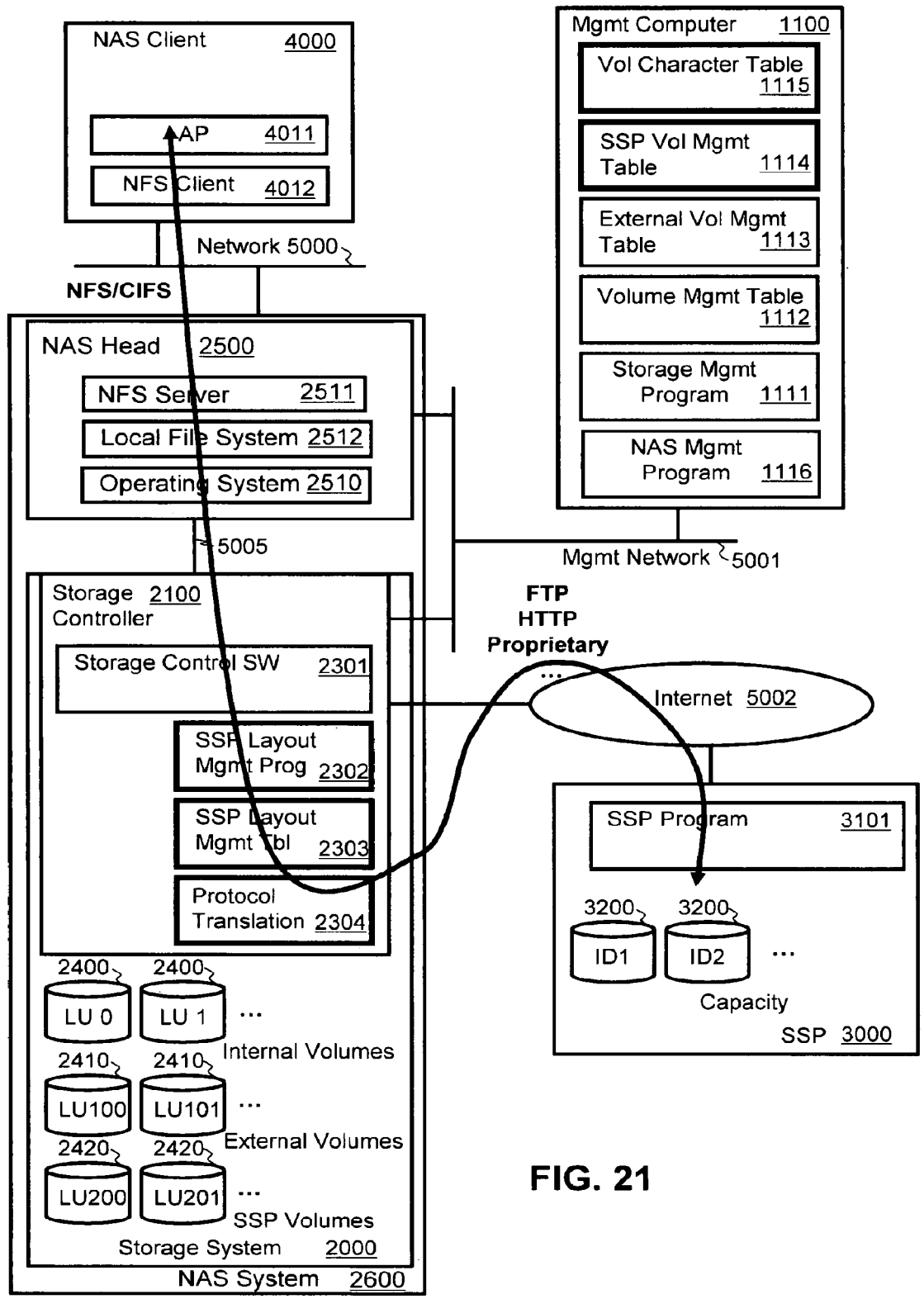
FIG. 21 illustrates a conceptual diagram of the configuration of FIGS. 19 and 20.

FIG. 21 illustrates a conceptual diagram of the configuration of FIGS. 19 and 20. In this embodiment, the NAS head 2500 carries out functions similar to host computer 1000 in the embodiments described above. NAS head 2500, in effect, acts as a translator between the file-level NAS protocols (NFS, CIFS, etc.) received from NAS clients 4000, and the block-level protocols used for storing data to storage system 2000. Accordingly, the processes carried out in this embodiment are the same as the embodiments described above with respect to FIGS. 1-14.

SSP-Aware NAS With SSP-Unaware Storage System

Figure 22:
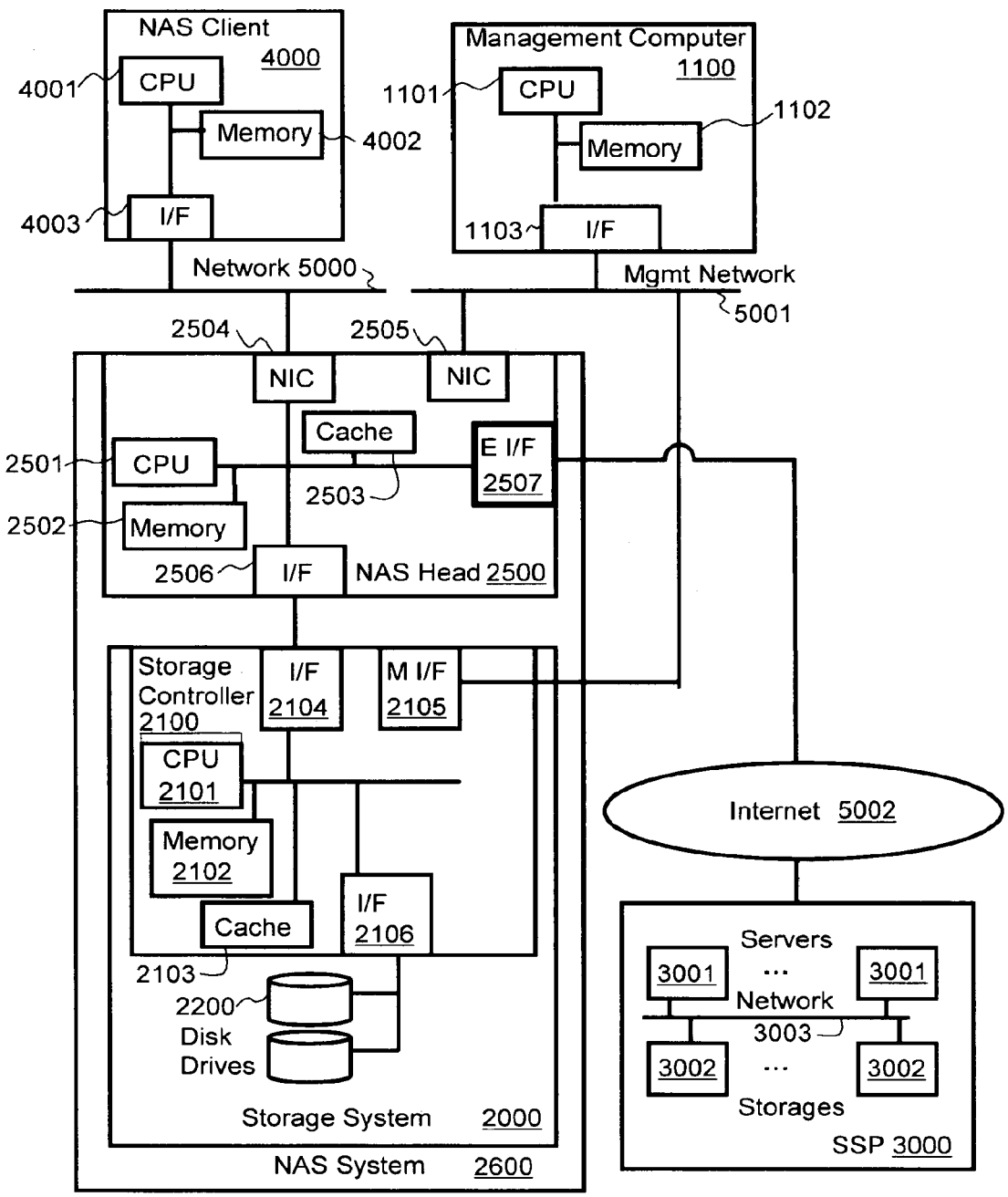
FIG. 22 illustrates an alternative example of a hardware configuration including a SSP-aware NAS head and a SSP unaware storage system.

FIG. 22 illustrates an example of the second hardware configuration in which NAS system 2600 includes NAS head 2500 in communication with storage system 2000. However, in this embodiment, the functionality of the invention is moved from storage system 2000 to NAS head 2500. Additionally, NAS head 2500 includes an interface 2507 the enables connection of NAS head 2500 to the SSP 3000 via network 5002, whereas in the previous configurations, the network connection to the SSP came out of storage system 2000. As discussed above, the typical network for the connection 5002 is the Internet. The hardware components otherwise remain the same, as described above.

Figure 23:
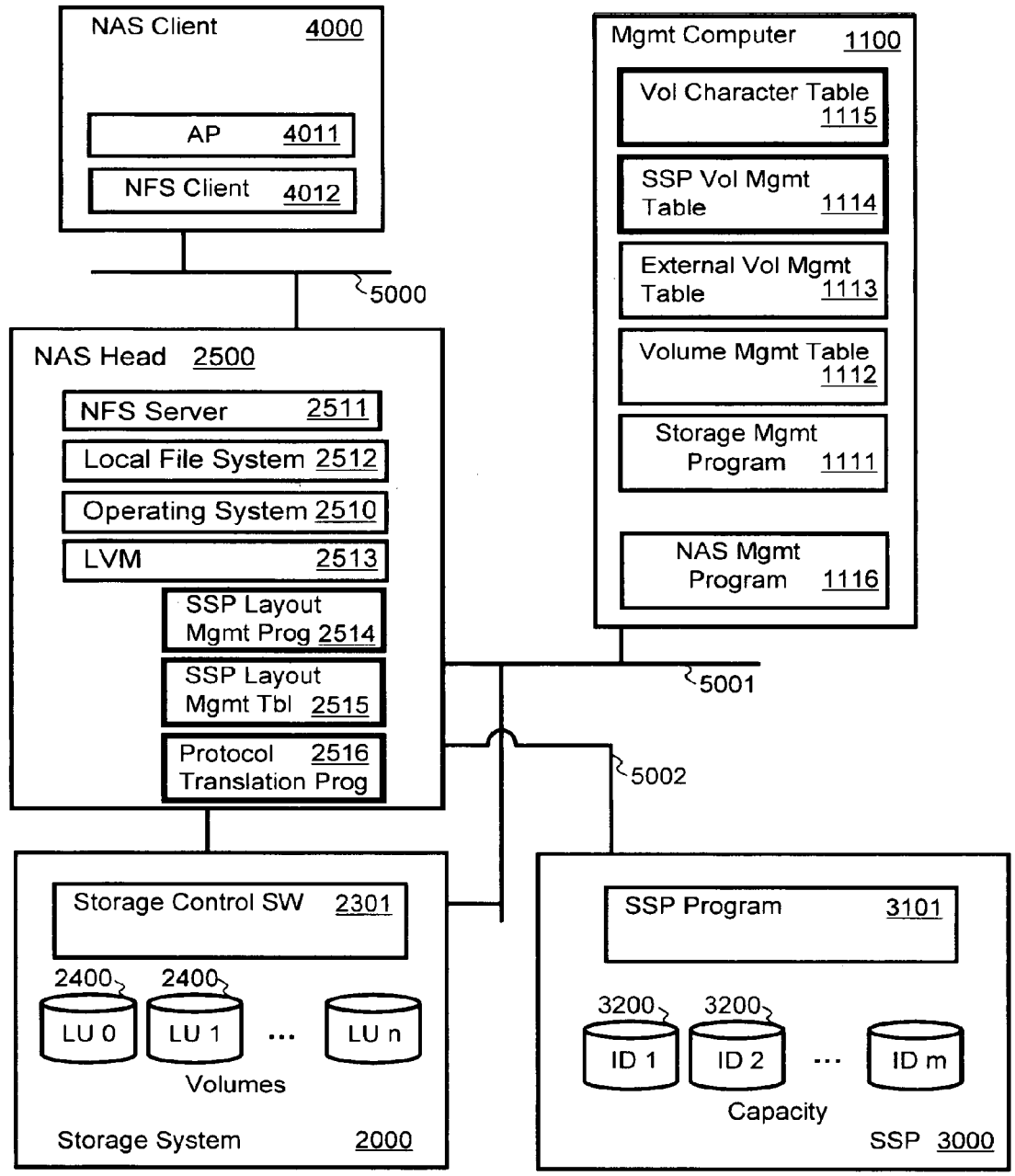
FIG. 23 illustrates an exemplary software configuration implemented in the architecture of FIG. 22.

In the embodiment of FIG. 22, NAS head 2500 is made SSP aware, and NAS client 4000 is able to access SSP-aware NAS head 2500 via a file system interface such as NFS or CIFS. FIG. 23 illustrates an example of a software configuration for implementing SSP aware NAS head 2500 while storage system 2000 is not SSP aware. NAS head 2500 includes a Logical Volume Manager (LVM) 2513 which works with SSP-aware components to provide virtual SSP volumes. SSP-aware NAS head 2500 also includes a SSP layout management program 2514, a SSP layout management table 2515, and a protocol translation program 2516 maintained in the NAS head 2500 instead of in storage system 2000. The SSP layout management table is the same as illustrated in FIG. 9. The SSP layout management program 2514 and protocol translation program 2516 function similarly as described above, with the differences being set forth below. Management computer includes a NAS management program 1116 for managing features on the NAS head. The other software components, such as those in the management computer 1100, are the same as described above.

Figure 24:
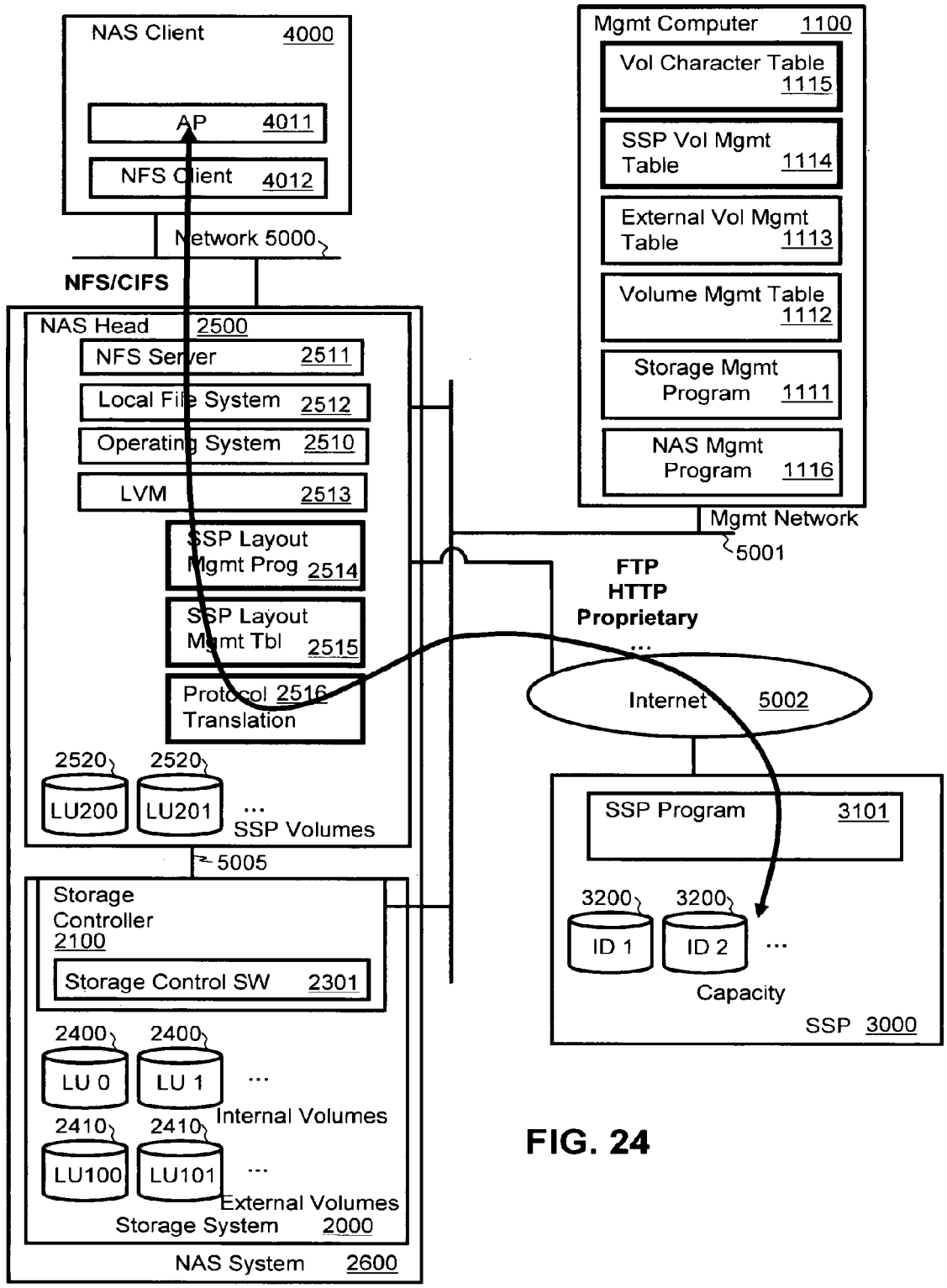
FIG. 24 illustrates a conceptual diagram of the configuration of FIGS. 22 and 23.

FIG. 24 illustrates a conceptual diagram of this embodiment. SSP volumes 2520 are virtual volumes virtualized in the NAS head 2500 by LVM 2513. As in the embodiments described in FIGS. 1-14, the SSP 3000 may be communicated with via FTP, HTTP or a proprietary interface. LVM 2513 carries out many of the functions carried out by storage control SW 2301 in the prior embodiments. In the following sections, procedures for the SSP-aware NAS with SSP unaware storage system are described, with the differences from the embodiments of FIGS. 1-14 being described below.

Additionally, there is another method for implementing SSP-aware components in this embodiment, which is through a file system. In the embodiment of FIGS. 23-24, LVM 2513 provides a virtual volume from a volume pool which is composed of multiple physical volumes 2400. A file system can be created on the virtual volume. However, alternatively, the file system may be created on a single physical volume 2400, and then LVM 2513 is not needed. In this case, a file system can take over the role of LVM 2513. The file system itself manages a file by file system level blocks (in which a block is constructed by multiple LBAs). Then, each file system level block can be associated with a file on SSP 3000.

SSP Volume Creation

Figure 25:
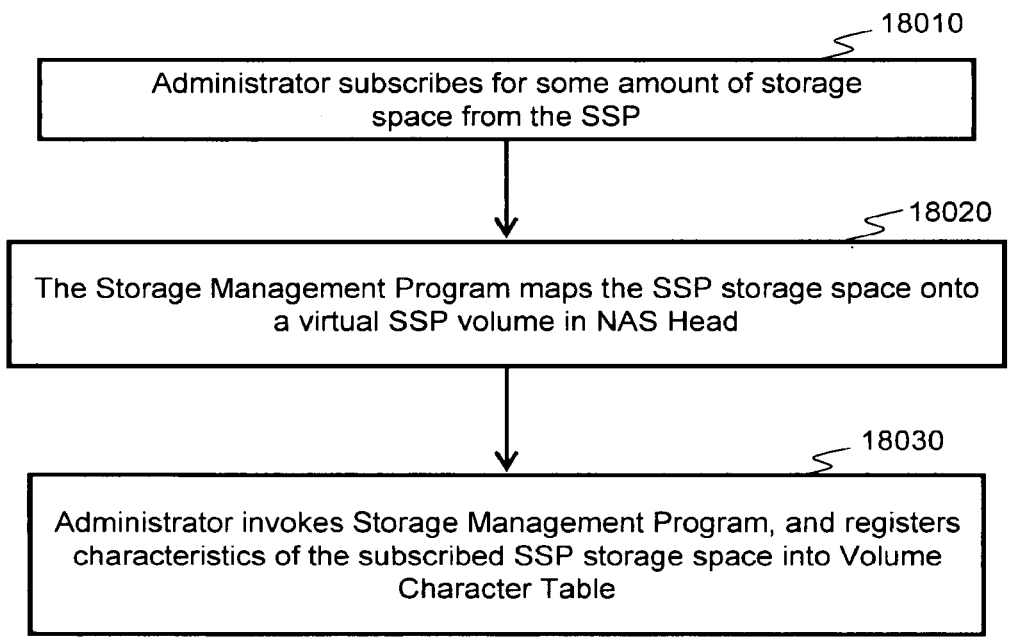
FIG. 25 illustrates an example of a control procedure to create a virtual volume and map the SSP capacity to the virtual volume in this embodiment.

FIG. 25 illustrates a typical control procedure to create a virtual volume and map the SSP capacity to the virtual volume.

Step 18010: Same as Step 11010 in FIG. 10.

Step 18020: An administrator invokes the storage management program 1111. The Storage management program 1111 maps the SSP storage space 3200 onto a virtual SSP volume 2520 in the NAS Head 2500.

Step 18030: Same as Step 11030 in FIG. 10.

File System Creation On SSP Volume

Figure 26:
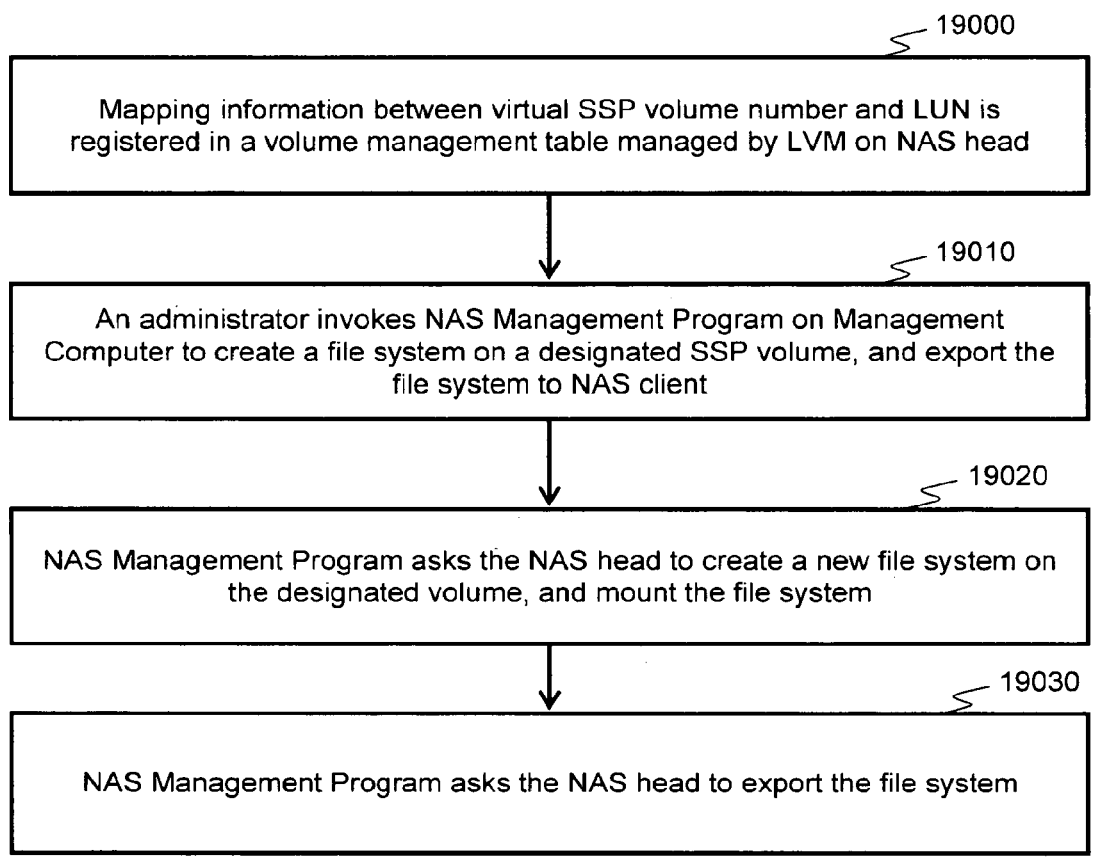
FIG. 26 illustrates an example of a control procedure to create a file system on the SSP volume.

When the virtual SSP volume 2520 is created on NAS head 2500 by LVM 2513, the virtual volume 2520 can be discovered on the NAS head, and a file system can be created on the virtual SSP volume 2520. Thus, instead of defining a path to the SSP virtual volume, as in the earlier embodiments, a file system creation should be performed. FIG. 26 illustrates an example of a control procedure to create a file system on the virtual SSP volume 2520.

Step 19000: At the creation of the virtual SSP volume 2520, the mapping information between virtual SSP volume number and LUN is registered in a volume management table (not shown) managed by LVM 2513 on NAS head 2500. The volume management table on NAS head 2500 is similar to the volume management table 1112, as illustrated in FIG. 6, on management computer 1100. The difference is there is no need in this embodiment to manage the path definition, which means there is no need for a port number (WWN) entry 11123.

Step 19010: An administrator invokes NAS management program 1116 on management computer 1100 to create a file system on a designated virtual SSP volume 2520. When the file system has been created successfully, the file system is exported to NAS client 4000.

Step 19020: NAS management program 1116 instructs the NAS head 2500 to create a new file system on the designated volume 2520, and mount the file system.

Step 19030: NAS management program instructs the NAS head to export the file system to the NAS clients 4000. After finishing the above operations, a NAS client 4000 can access the file system on the virtual SSP volume 2520. Further, since the above procedure is typically used for the planned creation of a file system, an administrator invokes the operations. However, when unplanned file system creation is required, such as to increase file system capacity upon the occurrence of a capacity shortage in a thin provisioned volume, the storage management program 1111 can create a virtual SSP volume dynamically. In this case, if the administrator gives permission for the storage management program 1111, and the storage management program 1111 can create the virtual SSP volume 2520, and create a file system on the SSP volume by using the procedure of FIG. 25 and FIG. 26.

WRITE Access To SSP Volume

Figure 27A:
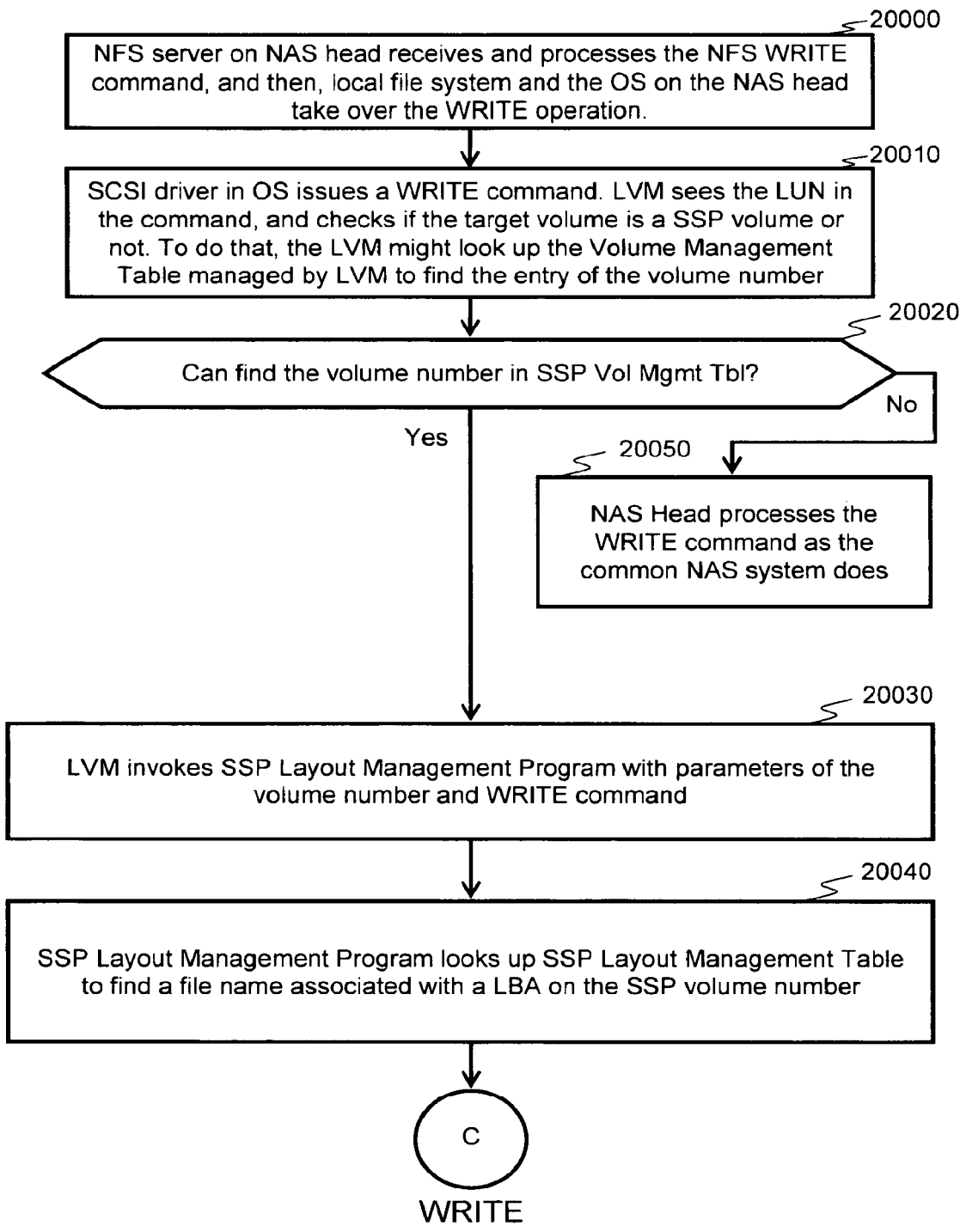
FIGS. 27A-27B illustrate an example of a control procedure for the NAS client to write data on the SSP volume.
Figure 27B:
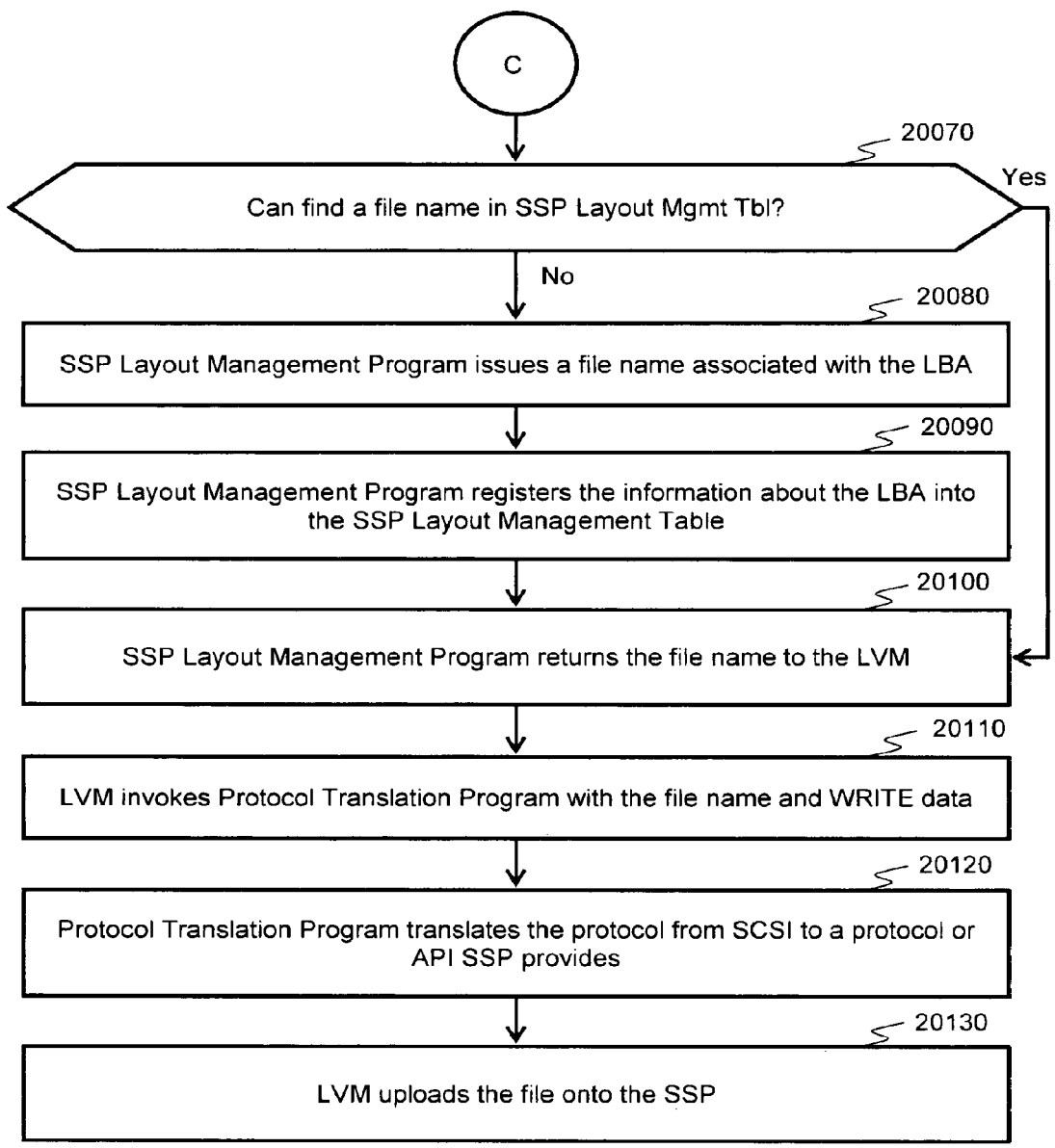

There is no need for AP 4011 to change the access method to SSP volume-based file systems from conventional volume-based file systems managed by NAS head. FIGS. 27A-27B illustrate an example of control procedure for NAS client 4000 to write data on SSP volume.

Step 20000: AP 4011 on NAS client 4000 issues a write operation, and then Network File System (NFS) client 4012 on NAS client computer 4000 issues a NFS WRITE command. Typical examples of Network File System protocols are NFS and CIFS. NFS server 2511 on NAS Head 2500 receives and processes the NFS WRITE command, and then, local file system 2512 and the OS 2510 on the NAS head 2500 take over the WRITE operation. If the NAS head 2500 employs a write-through cache mechanism, the following operations are done immediately. If the NAS head 2500 employs a write-back cache mechanism, the WRITE data is written on the cache 2503, and the following operations are done during the cache data flush phase.

Step 20010: A SCSI driver of the OS issues a WRITE command, and the LVM 2513 sees the LUN in the command, and checks if the target volume is a SSP volume or not. To do that, the LVM might refer to the volume management table managed by LVM to find the entry of the specified volume number.

Step 20020: If the volume number is found in the volume management table, this means the volume is a SSP volume, and the process goes to Step 20030. On the other hand, if the volume is not found in the volume management table, then the process goes to Step 20050.

Step 20030: LVM 2513 invokes SSP layout management program 2514 with parameters of the volume number and the WRITE command.

Step 20040: The SSP layout management program looks up SSP layout management table 2515 to find a file name associated with a specified LBA on the SSP volume.

Step 20050: If the volume number is NOT found in the Volume management table in Step 20020, this means the volume is either a conventional internal or external volume, and the NAS Head processes the WRITE command as a conventional NAS system.

Step 20070: The process checks whether there is a file name in the SSP layout management table 2515 that corresponds to the specified LBA.

Step 20080: If a file name is NOT found in the SSP layout management table 2515, this means that this is a first write operation to the specified LBA, and the SSP layout management program 2514 issues a file name to be associated with the specified LBA).

Step 20090: The SSP layout management program 2514 registers the information about the LBA into the SSP layout management table.

Step 20100: The SSP layout management program 2514 returns the file name to the LVM 2513. The file name is preferably unique in the SSP, and the rule for creating the file name does not restrict the invention. One example of a method for creating the file name is to use the external port ID, LUN, and LBA as a file path name. When the SSP uses an interface other than the file interface, the SSP layout management program issues an appropriate format for the association. Also, if a file name is found in the SSP layout management table at Step 20070, this means the write operation is an overwrite or update operation of existing data, and the SSP layout management program 2514 merely returns the found file name to the LVM.

Step 20110: LVM invokes protocol translation program 2516 with the file name and WRITE data.

Step 20120: The protocol translation program 2516 translates the protocol from SCSI to a protocol or API specified by SSP 3000. There may be a couple of different protocols or APIs which SSPs provide. Then, the protocol translation program 2516 might support a couple of different protocols or APIs. For example, if the SSP uses FTP protocol, then the protocol translation program translates the SCSI WRITE command into a PUT command. If the SSP uses HTTP/1.1, protocol translation program 2516 also translates the SCSI WRITE command into a PUT command. If the SSP uses HTTP/1.0 with CGI, then protocol translation program 2516 translates the SCSI WRITE command into a POST command.

Step 20130: The LVM 2513 uploads the data as a file onto the SSP 3000. Further, it should be noted that the WRITE command process set forth above does not restrict the invention.

READ Access To SSP Volume

Figure 28A:
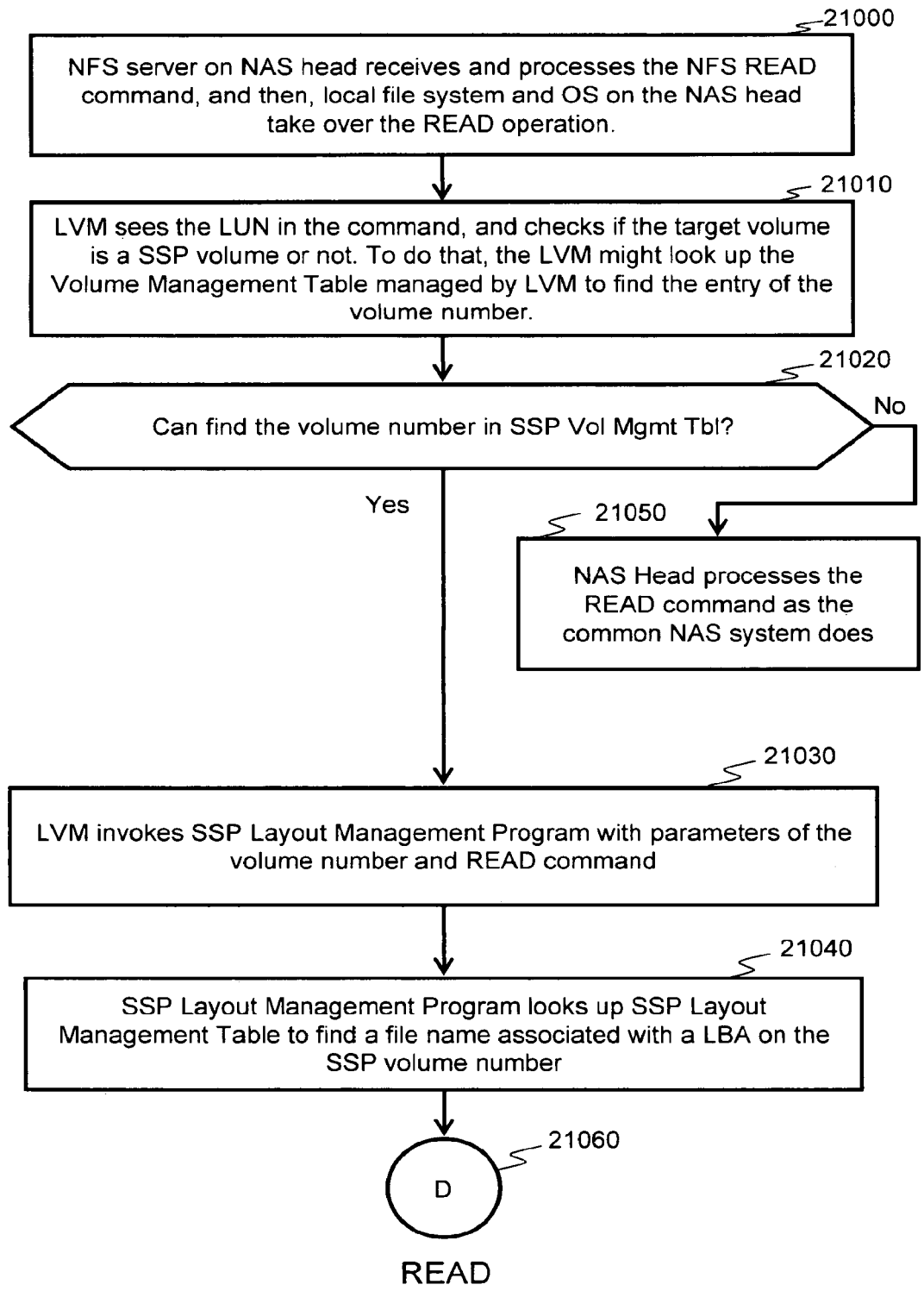
FIGS. 28A-28B illustrate an example of a control procedure for NAS client to read data on the SSP volume.
Figure 28B:
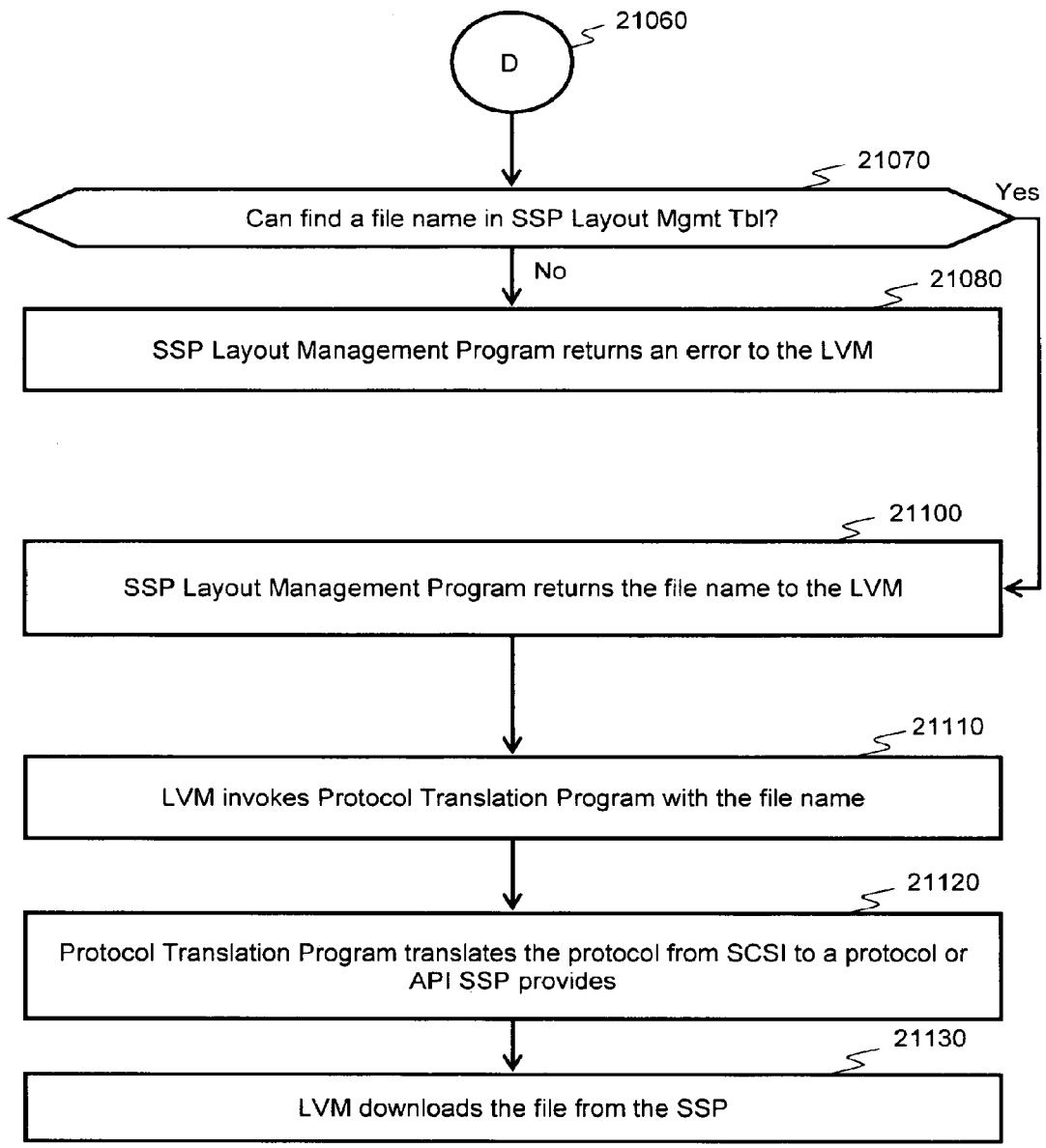

There is no need for an application on a client computer 4000 to change its access method for accessing virtual SSP volume-based file systems from the other conventional volume-based file systems. FIGS. 28A-28B illustrate an example of a control procedure for NAS client 4000 to read data on a virtual SSP volume 2520.

Step 21000: AP 4011 on NAS client 4000 issues a read operation, and then NFS client 4012 on NAS client issues a NFS READ command. NFS server 2511 on NAS head 2500 receives and processes the NFS READ command, and then, local file system 2512 and OS 2510 on the NAS head 2500 take over the READ operation. If the read data is on the cache 2530 of the NAS head 2500, then the NAS OS returns the data immediately. If the read data is NOT on the cache of the NAS head 2500, the LVM 2513 on the NAS head 2500 needs to read the data from a volume.

Step 21010: LVM acquires the LUN in the READ command, and checks if the target volume is a virtual SSP volume or not. To do that, the LVM might look up the volume management table managed by LVM 2513 to find the entry of the volume number.

Step 21020: If the volume number is found in the SSP volume management table, this means the volume is a SSP volume, and the process goes to Step 21030. On the other hand, if a volume number is not found, this means that the specified LUN is not for a virtual SSP volume, and the process goes to Step 21050.

Step 21030: LVM 2513 invokes SSP layout management program 2514 with parameters of the volume number and READ command.

Step 21040: The SSP layout management program 2514 refers to SSP layout management table 2515 to find a file name associated with a LBA specified in the READ command on the SSP volume number.

Step 21050: If the volume number is NOT found in the SSP volume management table, this means the volume specified in the READ command is either an internal or external volume, and the NAS head processes the READ command as a conventional NAS system does.

Step 21070: The process checks whether a file name corresponding to the specified LBA is listed in the SSP layout management table 2515. If a file name is listed, the process goes to Step 21100; if not, the process goes to Step 21080.

Step 21080: If a file name is NOT found in the SSP layout management table, this means there is something wrong with the READ command, and the SSP layout management program returns an error to the LVM 2513.

Step 21100: If a file name is found in the SSP layout management table 2515, the SSP layout management program 2514 returns the found file name to the LVM 2513.

Step 21110: LVM 2513 invokes protocol translation program 2516 with the file name.

Step 21120: The protocol translation program 2516 translates the protocol from SCSI to a protocol or API that the SSP 3000 provides and sends the request to read the data from the SSP 3000. There may be a couple of different protocols or APIs provided by SSPs. Then, the protocol translation program 2516 might support a couple of different protocols or APIs. For example, if the SSP uses FTP protocol, then the protocol translation program 2516 translates the SCSI READ command into a GET command. If the SSP uses HTTP/1.1, protocol translation program 2516 also translates the SCSI READ command into a GET command.

Step 21000: LVM 2513 downloads the file from the SSP, and the NFS server 2511 returns the data to the requesting client using NFS/CIFS protocol. Further, it should be noted that the particular READ command process set forth above does not restrict the invention.

SSP Volume Deletion

Figure 29:
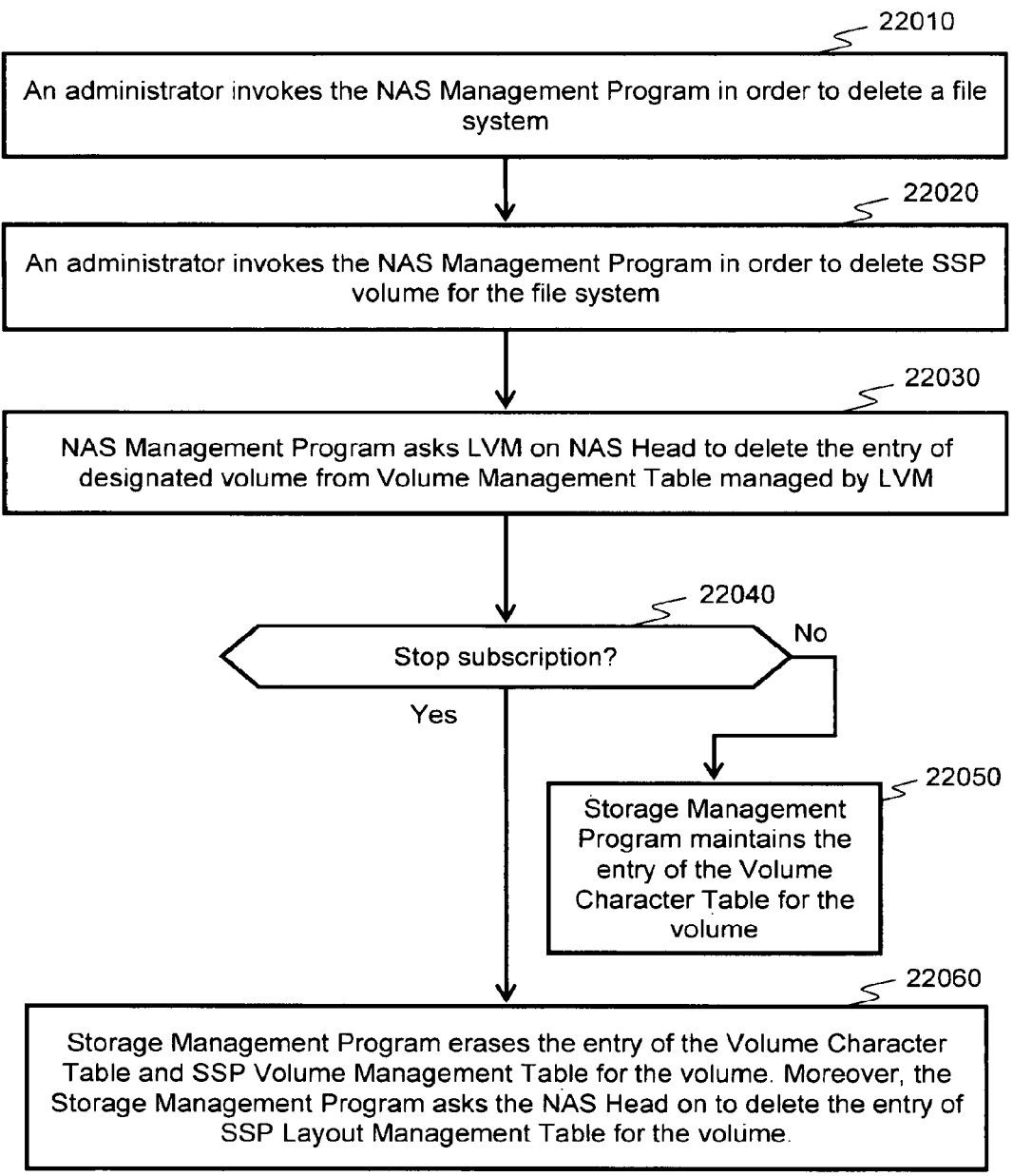
FIG. 29 illustrates an example of a control procedure to delete a file system on the SSP volume and/or delete the SSP volume itself.

FIG. 29 illustrates an example of a control procedure to delete a file system on a virtual SSP volume 2520, and the virtual SSP volume 2520 itself.

Step 22010: An administrator invokes the NAS management program 1116 in order to delete a file system.

Step 22020: The administrator invokes the NAS management program 1116 in order to delete virtual SSP volume 2520 for the file system, if necessary.

Step 22030: The NAS management program 1116 instructs LVM 2513 on NAS head 2500 to delete the entry of the designated volume from the volume management table managed by LVM 2513. Then, the NAS OS 2510 can no longer discover the volume.

Step 22040: Storage management program 1111 can ask the administrator if the subscription of the SSP storage space should be maintained or not.

Step 22010: If the administrator answers to keep the subscription, the entry of the volume character table 1115 for the volume is maintained. In this case, the deleted volume can be reused in the future. If the same NAS client and same application will use the same volume, recreation of mapping to the volume must merely be sufficient to reuse the volume. However, if a different NAS client or other application will use the volume, the deletion of the data in the SSP volume must usually be carried out before mapping creation.

Step 22060: If the administrator answers not to keep the subscription, the entry of the volume character table 1115 and SSP volume management table 1114 for the volume are erased. Moreover, the storage management program 1111 instructs the NAS head 2500 to delete the entry from the SSP layout management table 2515 for the specified volume. Then, the association between the specified virtual SSP volume and the SSP storage space is also erased. The subscription stop operation can be done by the administrator manually, or by the storage management program 1111 by using an API provided by the SSP 3000.

iSCSI SSP

Figure 30:
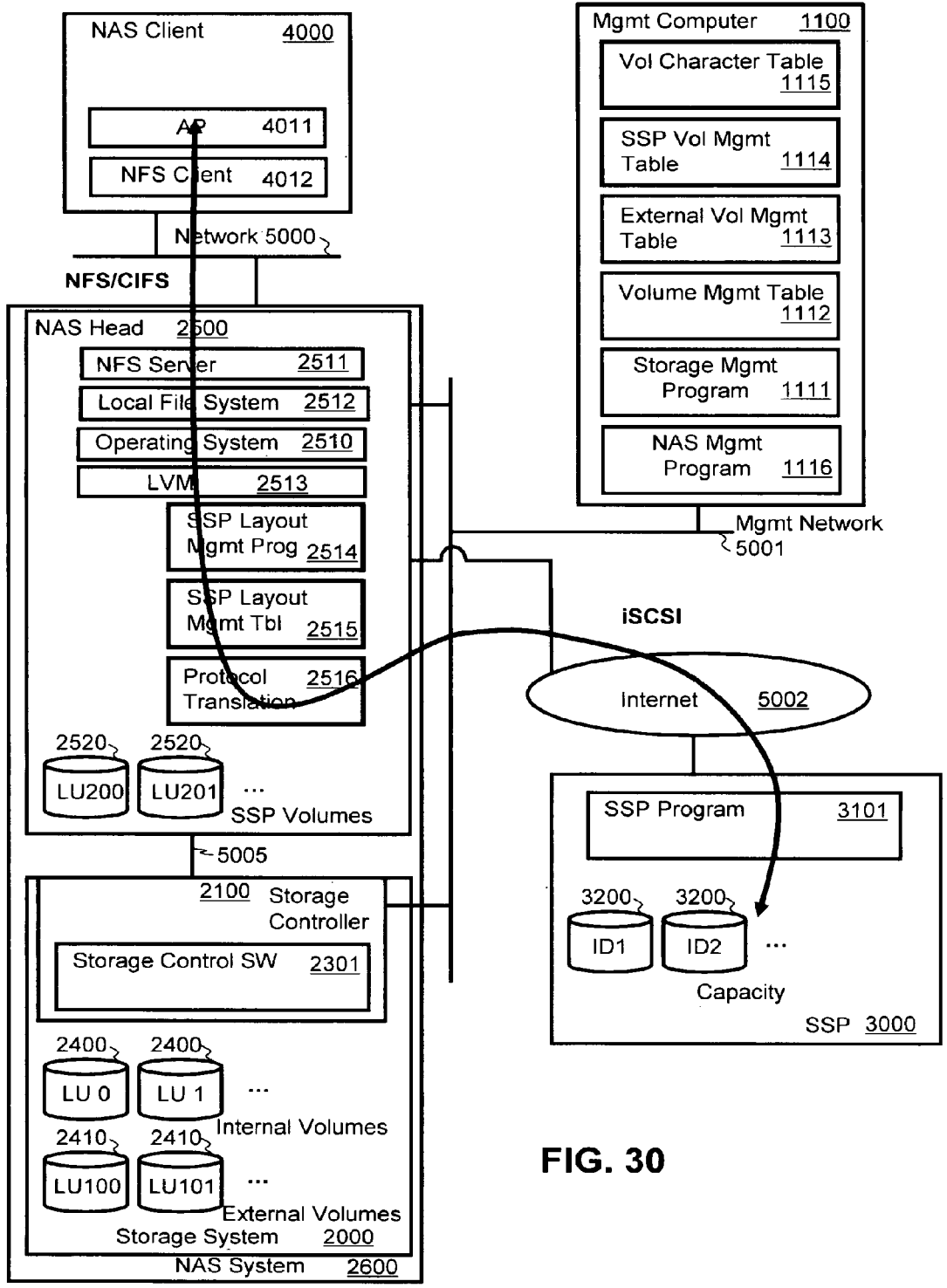
FIG. 30 illustrates a conceptual diagram of a SSP aware NAS with an iSCSI SSP.

FIG. 30 represents a conceptual diagram of the SSP-aware NAS head of FIGS. 22 and 23 in communication with a SSP 3000 that uses an iSCSI communication protocol. The SSP with iSCSI interface can be utilized by SSP aware NAS in the same as described above with reference to FIGS. 15-17. Thus, SSP-aware NAS head 2500 receives an I/O request in NFS/CIFS for a file in a virtual SSP volume 2520, correlates the file in the virtual SSP volume 2520 with a LBA and LUN in physical capacity 3200 at SSP 3000, and sends translated I/O request to SSP 3000 using iSCSI that specifies the correlated LBA and LUN.

NAS SSP

Figure 31:
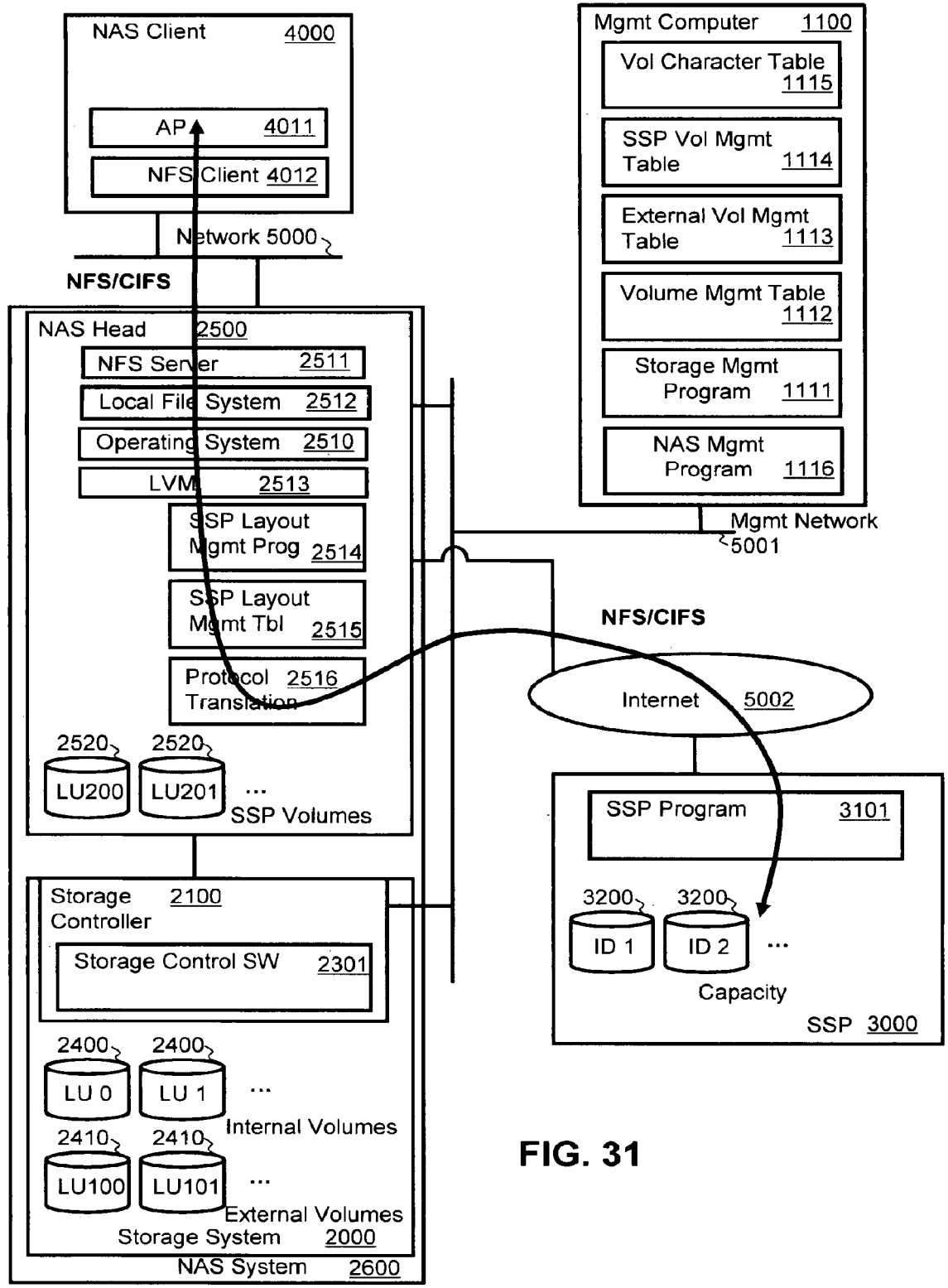
FIG. 31 illustrates a conceptual diagram of a SSP aware NAS with a NAS SSP.

FIG. 31 illustrates a conceptual diagram of the SSP-aware NAS head of FIGS. 22 and 23 in communication with a SSP 3000 that uses NFS/CIFS communication protocol (i.e., NAS interface). The SSP with NAS interface can be utilized with SSP-aware NAS in the same way as described above with reference to FIG. 18A. Thus, SSP-aware NAS head 2500 receives an I/O request in NFS/CIFS for a file in a virtual SSP volume 2520, correlates the file in the virtual SSP volume 2520 with a file in physical capacity 3200 at SSP 3000, and sends the translated I/O request specifying the file at SSP 3000 to the SSP 3000 using NFS/CIFS.

Thus, it may be seen that the invention provides a method and apparatus for enabling storage capacity on a SSP to be utilized in information systems using a variety of communications protocols. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed:

1. A storage system comprising:
    a controller having a CPU, a memory and an interface to communicate with a host computer and another storage system via a network,
    wherein said controller is operable to manage a file by a plurality of file system level blocks, each of the plurality of file system level blocks associated with another file of a plurality of files in the another storage system, the another file in the another strage system corresponding to a Uniform Resource Locator (URL) of a plurality of URLs for the another storage system, and
    wherein, if data of the file is requested by a read command from the host computer according to Network File System (NFS) protocol or Common Internet File System (CIFS) protocol, the controller, based on its management of the file, is operable to convert the read command according to the NFS protocol or CIFS protocol to a GET command according to Hypertext Transfer Protocol (HTTP) or File Transfer Protocol (FTP), send the GET command according to the HTTP or FTP to the another storage system, and receive the data of the file from the another storage system according to the HTTP or FTP.

2. The storage system according to claim 1:
    wherein said controller manages a plurality of storage volumes for storing data.

3. The storage system according to claim 1,
    wherein said memory stores information identifying a location where the data of the file is stored, the information being referred to when the controller determines whether or not the data of the file requested by the read command according to the NFS protocol or CIFS protocol is stored in the another storage system.

4. The storage system according to claim 1,
    wherein a location of the data of the file being received from the another storage system according to the HTTP or FTP is managed by the URL.

5. The storage system according to claim 1,
    wherein the controller is operable to manage external volumes which are mapped to an external storage system.

6. The storage system according to claim 1,
    wherein the controller is operable to, if the data of the file requested by the read command according to the NFS protocol or CIFS protocol is stored in a cache memory in the controller, return the data of the file requested by the read command to the host computer according to the NFS protocol or CIFS protocol without attempting to obtain the data from the another storage system according to the HTTP or FTP.

7. The storage system according to claim 1, further comprising:
a plurality of storage devices storing data sent from the host computer.

8. A system including the storage system according to claim 1, further comprising:
the another storage system.

9. A storage system comprising:
a controller being operable to manage a file by a plurality of file system level blocks, each of the plurality of file system level blocks being associated with another file of a plurality of files in another storage system, the another file in the another storage system corresponding to a Uniform Resource Locator (URL) of a plurality of URLs for the another storage system, and
if data of the file is requested by the read command from a host computer according to Network File System (NFS) protocol or Common Internet File System (CIFS) protocol, the controller, based on its management of the file, is operable to send to the another storage system a command according to Hypertext Transfer Protocol (HTTP), which relates to the read command according to the NFS protocol or CIFS protocol, receive the data of the file from the another storage system according to the HTTP, and return data, which relates to the data of the file received from the another storage system, to the computer according to the NFS protocol or CIFS protocol.

10. The storage system according to claim 9:
wherein the controller manages a plurality of storage volumes for storing data.

11. The storage system according to claim 9, further comprising:
a plurality of storage devices storing data sent from the computer.

12. The storage system according to claim 9,
wherein a memory in the controller is operable to store information identifying a location where the data of the file is stored, the information being referred to when the controller determines whether or not the data of the file requested by the read command according to the NFS protocol or CIFS protocol is stored in the another storage system.

13. The storage system according to claim 9,
wherein a location of the data of the file being received from the another storage system according to the HTTP is managed by the URL.

14. The storage system according to claim 9,
wherein the controller is operable to manage external volumes which are mapped to an external storage system.

15. The storage system according to claim 9,
wherein the controller is operable to, if the data of the file requested by the read command according to the NFS protocol or CIFS protocol is stored in a cache memory in the controller, return the data of the file requested by the read command to the computer according to the NFS protocol or CIFS protocol without attempting to obtain the data from the another storage system according to the HTTP.

16. The storage system according to claim 9,
wherein the command according to the HTTP sent from the controller to the another storage system is a GET command according to the HTTP.

17. A system including the storage system according to claim 9, further comprising:
the another storage system.

18. A storage system comprising:
a controller being operable to manage a file by a plurality of file system level blocks, each of the plurality of file system level blocks being associated with another file of a plurality of files in another storage system, the another file in the another storage system corresponding to a Uniform Resource Locator (URL) of a plurality of URLs for the another storage system, and
if data of the file is requested by a read command according to Network File System (NFS) protocol or Common Internet File System (CIFS) protocol is stored in another storage system, the controller, based on its management of the file, is operable to send to the another storage system a command according to Hypertext Transfer Protocol (HTTP) or File Transfer Protocol (FTP), which corresponds to the read command according to the NFS protocol or CIFS protocol, so that the controller can obtain the data of the file from the another storage system according to the HTTP or FTP and return the data of the file requested by the read command to the host computer according to the NFS protocol or CIFS protocol.

19. The storage system according to claim 18:
wherein the controller manages a plurality of storage volumes for storing data.

20. The storage system according to claim 18, further comprising:
a plurality of storage devices storing data sent from the computer.

21. The storage system according to claim 18,
wherein a memory in the controller is operable to store information identifying a location where the data requested by the read command is stored, the information being referred to when the controller determines whether or not the data requested by the read command according to the NFS protocol or CIFS protocol is stored in the another storage system.

22. The storage system according to claim 18,
wherein a location of the data of the file being obtained from the another storage system according to the HTTP is managed by the URL.

23. The storage system according to claim 18,
wherein the controller is operable to manage external volumes which are mapped to an external storage system.

24. The storage system according to claim 18,
wherein the controller is operable to, if the data requested by the read command according to the NFS protocol or CIFS protocol is stored in a cache memory in the controller, return the data requested by the read command to the computer according to the NFS protocol or CIFS protocol without attempting to obtain the data from the another storage system according to the HTTP or FTP.

25. The storage system according to claim 18,
wherein the command according to the HTTP or FTP sent from the controller to the another storage system is a GET command according to the HTTP or FTP.

26. A system including the storage system according to claim 18, further comprising:
the another storage system.

* * * * *